United States Patent
Okado et al.

(10) Patent No.: US 11,927,795 B2
(45) Date of Patent: Mar. 12, 2024

(54) PLANAR LIGHT SOURCE INCLUDING A PLURALITY OF LIGHT-EMITTING UNITS

(71) Applicant: NICHIA CORPORATION, Anan (JP)

(72) Inventors: Ryoma Okado, Naruto (JP); Satoshi Yoshinaga, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/050,767

(22) Filed: Oct. 28, 2022

(65) Prior Publication Data
US 2023/0152511 A1    May 18, 2023

(30) Foreign Application Priority Data

Oct. 29, 2021    (JP) .................................. 2021-177477

(51) Int. Cl.
*F21V 8/00*        (2006.01)
*H05B 45/10*       (2020.01)

(52) U.S. Cl.
CPC ......... *G02B 6/0078* (2013.01); *G02B 6/0021* (2013.01); *G02B 6/0031* (2013.01); *G02B 6/0043* (2013.01); *G02B 6/0051* (2013.01); *G02B 6/0055* (2013.01); *G02B 6/0066* (2013.01); *G02B 6/0068* (2013.01); *G02B 6/0073* (2013.01); *G02B 6/0083* (2013.01); *H05B 45/10* (2020.01)

(58) Field of Classification Search
CPC ............... G02B 6/0021; G02B 6/0031; G02B 6/0055; G02B 6/0078; G02F 1/133605; G02F 1/133606; G02F 1/133611
See application file for complete search history.

(56) References Cited

U.S. PATENT DOCUMENTS

| | | | |
|---|---|---|---|
| 2009/0086508 A1* | 4/2009 | Bierhuizen | G02F 1/133603 362/617 |
| 2010/0296026 A1 | 11/2010 | Kubota et al. | |
| 2012/0139445 A1 | 6/2012 | Fujiwara et al. | |
| 2020/0166804 A1* | 5/2020 | Zheng | G02F 1/133608 |
| 2020/0285111 A1* | 9/2020 | Chen | H05B 45/14 |

(Continued)

FOREIGN PATENT DOCUMENTS

| | | |
|---|---|---|
| JP | 2006189665 A | 7/2006 |
| JP | 2007109692 A | 4/2007 |
| JP | 2009018461 A | 1/2009 |

(Continued)

*Primary Examiner* — Keith G. Delahoussaye
(74) *Attorney, Agent, or Firm* — Hunton Andrews Kurth LLP

(57) ABSTRACT

A planar light source includes a light guide member including light-emitting units separated by a groove and one or more light sources disposed in one or more of the light-emitting units. The light-emitting units include outer portions and at least one inner portion located in a region surrounded by the outer portions in a plan view. In the plan view, at least one of the outer portions is adjacent to a smaller number of light-emitting units than a number of light-emitting units to which one of the at least one inner portion is adjacent. In a state in which the same power is supplied and one of the outer portions and one of the at least one inner portion are allowed to individually emit light, brightness of the one of the outer portions is higher than brightness of the one of the at least one inner portion.

19 Claims, 23 Drawing Sheets

(56) References Cited

U.S. PATENT DOCUMENTS

2021/0247051 A1  8/2021  Nakabayashi et al.
2021/0247053 A1  8/2021  Nakabayashi et al.

FOREIGN PATENT DOCUMENTS

| JP | 2010272406 A | 12/2010 |
| JP | 2011029023 A | 2/2011 |
| JP | 2013157258 A | 8/2013 |
| JP | 2020013714 A | 1/2020 |
| JP | 2021125455 A | 8/2021 |
| JP | 2021125456 A | 8/2021 |
| WO | 2011024498 A1 | 3/2011 |
| WO | 2020101038 A1 | 5/2020 |

* cited by examiner

PLANAR LIGHT SOURCE INCLUDING A PLURALITY OF LIGHT-EMITTING UNITS

CROSS-REFERENCE TO RELATED APPLICATION

This application claims priority to Japanese Patent Application No. 2021-177477, filed on Oct. 29, 2021, the disclosure of which is hereby incorporated by reference in its entirety.

An embodiment according to the present disclosure relates to a planar light source.

A light-emitting module acquired by combining a light-emitting element such as a light-emitting diode with a light guide plate is widely used in a planar light source such as a backlight for a liquid crystal display, for example (See, for example, Japanese Patent Publication No. 2020-13714).

SUMMARY

An object of an exemplary embodiment according to the present disclosure is to provide a planar light source in which luminance unevenness is reduced.

According to an exemplary aspect of the present disclosure, a planar light source includes a light guide member, one or more light sources. The light guide member includes a plurality of light-emitting units separated by a groove. The one or more light sources are disposed in one or more of the plurality of light-emitting units. The plurality of light-emitting units include a plurality of outer portions and at least one inner portion located in a region surrounded by the plurality of outer portions in a plan view. In the plan view, at least one of the plurality of outer portions is adjacent to a smaller number of light-emitting units than a number of light-emitting units to which one of the at least one inner portion is adjacent. In a state in which a same power is supplied and one of the plurality of outer portion and one of the at least one inner portion are allowed to individually emit light, brightness of the one of the plurality of outer portion is higher than brightness of the one of the at least one inner portion.

A planar light source according to an exemplary embodiment of the present disclosure can achieve an planar light source in which luminance unevenness is reduced.

DESCRIPTION OF EMBODIMENTS

Embodiments will be described below with reference to the drawings. Note that the drawings are diagrams that schematically illustrate embodiments, and thus scales, intervals, positional relationships, or the like of members are exaggerated, or illustration of some of the members may not be omitted. As a cross-sectional view, an end surface illustrating only a cut surface may be illustrated.

In the following description, components having substantially the same function may be denoted by the same reference signs and a description thereof may be omitted. Further, terms indicating a specific direction or position ("upper", "lower", and other terms including related to those terms) may be used. However, these terms are used merely to make it easy to understand relative directions or positions in the referenced drawing. As long as the relative direction or position is the same as that described in the referenced drawing using the term such as "upper" or "lower", in drawings other than the drawings of the present disclosure, actual products, and the like, components need not necessarily be arranged in the same manner as in the referenced drawing. In the present specification, "parallel" includes not only a case in which two straight lines, sides, surfaces, or the like do not intersect even if extended, but also a case in which angles formed by two straight lines, sides, surfaces, or the like intersect in a range of 10° or less. In the present specification, a positional relationship that expresses "on" includes a case in which an object is in contact and also a case in which an object is not in contact but located above.

Figure 1:
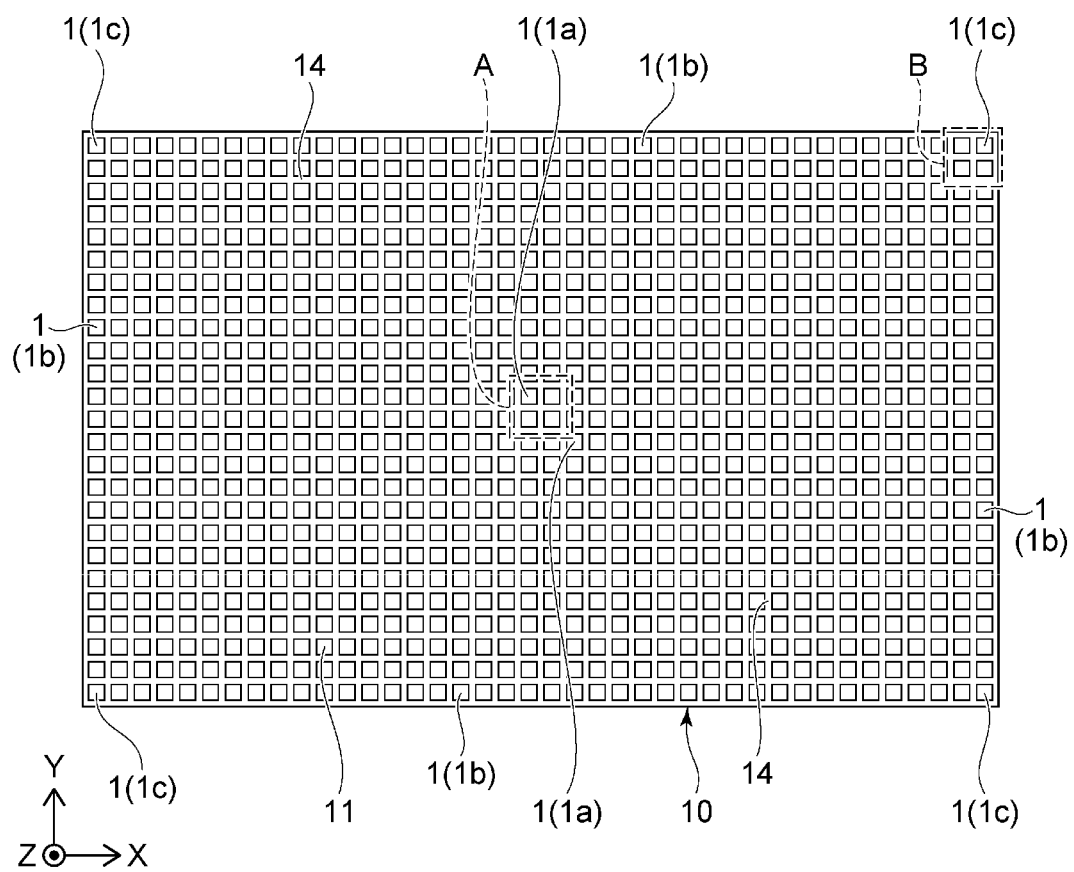
FIG. 1 is a schematic top view of an exemplary planar light source of exemplary embodiments.

FIG. 1 is a schematic top view of a planar light source of an embodiment.

Figure 3:
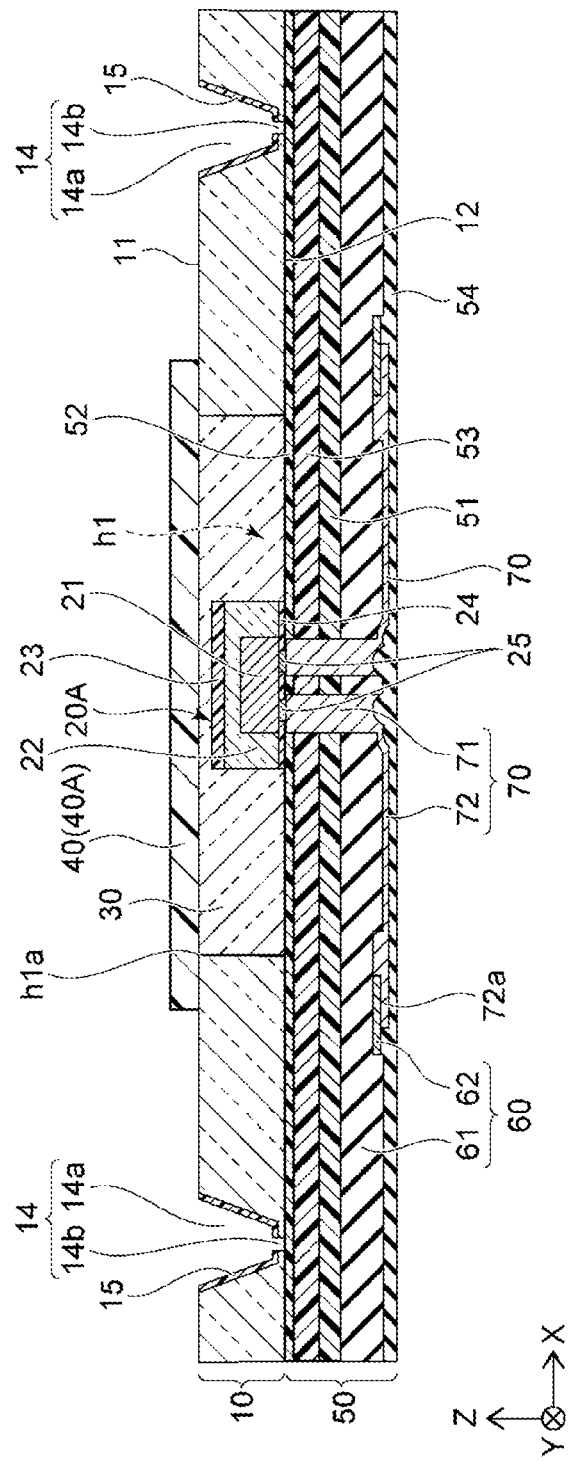
FIG. 3 is a schematic cross-sectional view taken along line in FIG. 2.

A planar light source of an embodiment includes a light guide member 10. The light guide member 10 includes a first surface 11 and a second surface 12 on a side opposite to the first surface 11 as shown in FIG. 3 and the like to be described below. In the present specification, two directions that are parallel to the first surface 11 of the light guide member 10 and are orthogonal to each other are referred to as a first direction X and a second direction Y. Further, a direction extending from the second surface 12 to the first surface 11 and orthogonal to the first direction X and the second direction Y is referred to as a third direction Z. The shape of the light guide member 10 in a plan view is, for example, a quadrangle having two sides extending in the first direction X and two sides extending in the second direction Y.

The light guide member 10 includes a plurality of light-emitting units 1 separated from each other in the first direction X and the second direction Y by grooves 14. Each of the light-emitting units 1 can serve as, for example, a driving unit for local dimming. The plurality of light-emitting units 1 include a plurality of outer portions 1b, a plurality of outer portions 1c, and at least one inner portion 1a. In the example illustrated in FIG. 1, a plurality of inner portions 1a are disposed in a region surrounded by the plurality of outer portions 1b and the plurality of outer portions 1c in the plan view. For example, the number of inner portions 1a is greater than the number of outer portions 1b and the number of outer portions 1c.

In the plan view, each of the plurality of outer portions 1b and each of the plurality of outer portions 1c are adjacent to a smaller number of light-emitting units 1 than the number of light-emitting units 1 to which one inner portion 1a is adjacent. The plurality of outer portions 1b and the plurality of outer portions 1c are light-emitting units 1 located on the outermost periphery of the region where the plurality of light-emitting units 1 are disposed in the plan view. The plurality of outer portions 1b and the plurality of outer portions 1c are arranged along the sides of the light guide member 10 in the plan view. The outer portions 1c are located at corners of the light guide member 10 in the plan view. The light-emitting unit 1 includes four outer portions 1c.

In the plan view, one outer portion 1c located at the corner is adjacent to one outer portion 1b in the first direction X, is adjacent to one outer portion 1b in the second direction Y, and is adjacent to one inner portion 1a in a diagonal direction of the light guide member 10. That is, in the plan view, one outer portion 1c located at the corner is adjacent to three light-emitting units 1.

In the plan view, one outer portion 1b of the plurality of outer portions 1b arranged in the second direction Y is adjacent to one inner portion 1a in the first direction X, is adjacent to two outer portions 1b (or one outer portion 1b and one outer portion 1c) in the second direction Y, and is adjacent to two inner portions 1a (or one inner portion 1a and one outer portion 1b) in an oblique direction inclined with respect to the first direction X and the second direction Y. In the plan view, one outer portion 1b of the plurality of outer portions 1b arranged in the first direction X is adjacent to one inner portion 1a in the second direction Y, is adjacent to two outer portions 1b (or one outer portion 1b and one outer portion 1c) in the first direction X, and is adjacent to two inner portions 1a (or one inner portion 1a and one outer portion 1b) in the oblique direction inclined with respect to the first direction X and the second direction Y. That is, in the plan view, one outer portion 1b is adjacent to five light-emitting units 1.

In the plan view, one inner portion 1a is adjacent to two inner portions 1a (or one inner portion 1a and one outer portion 1b) in the first direction X, is adjacent to two inner portions 1a (or one inner portion 1a and one outer portion 1b) in the second direction Y, and is adjacent to four inner portions 1a (or two inner portions 1a and two outer portions 1b, or one inner portion 1a, two outer portions 1b, and one outer portion 1c) in the oblique direction inclined with respect to the first direction X and the second direction Y. That is, in the plan view, one inner portion 1a is adjacent to eight light-emitting units 1.

Figure 2:
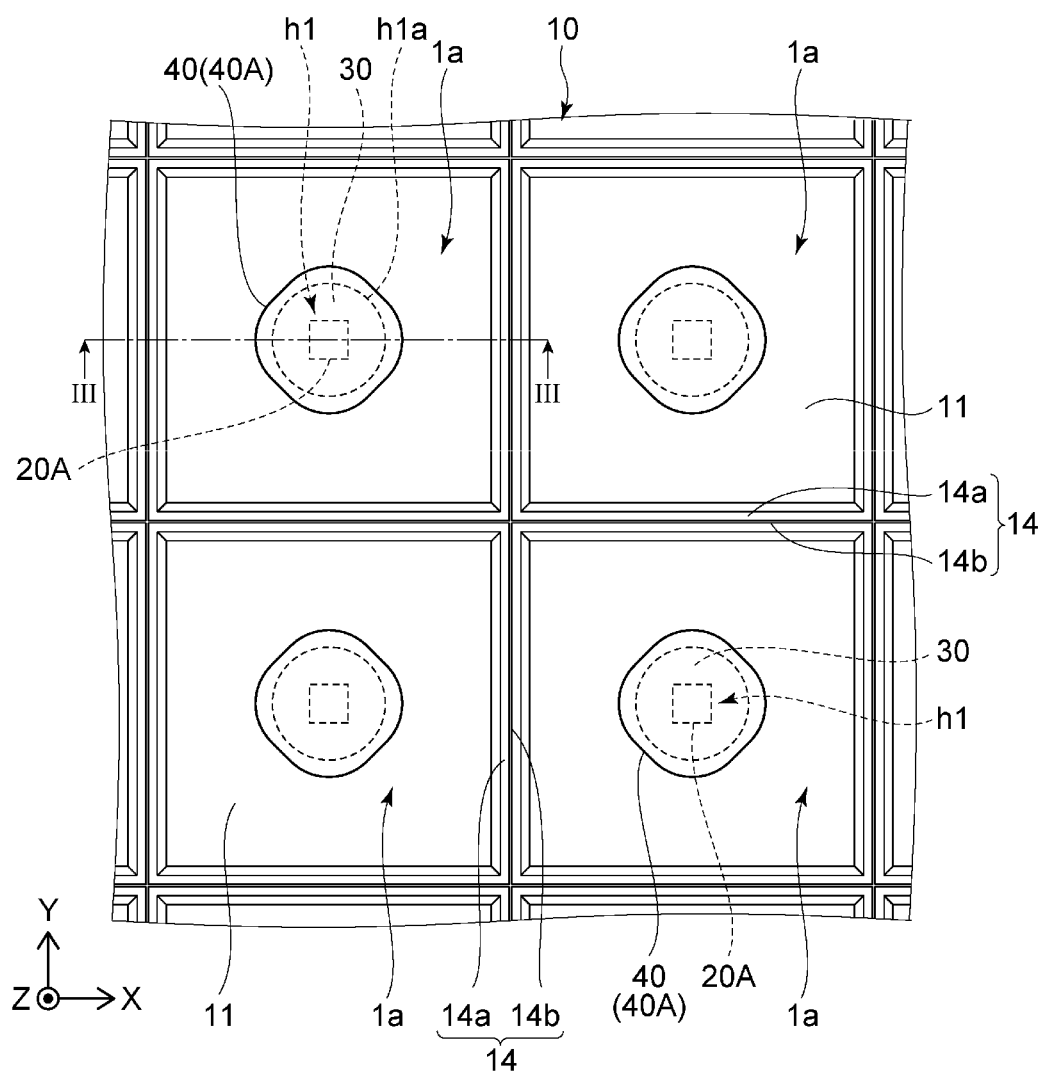
FIG. 2 is a schematic top view of a portion A in FIG. 1.

FIG. 2 is a schematic top view of a portion A in which the inner portion 1a is disposed in FIG. 1.

FIG. 3 is a schematic cross-sectional view taken along line in FIG. 2.

The planar light source of the embodiment includes a plurality of light sources 20A in addition to the light guide member 10. Moreover, the planar light source of the embodiment can include a support member 50, a first light-transmissive member 30, and a first light-reflective member 40.

Hereinafter, elements constituting the planar light source of the embodiment will be described in detail.

Light Guide Member

The light guide member 10 is light-transmissive to light emitted from the light source 20A. A transmittance of the light guide member 10 with respect to a peak wavelength of the light source 20A is preferably equal to or greater than 50% and more preferably equal to or greater than 70%, for example.

As a material of the light guide member 10, a thermoplastic resin such as acrylic, polycarbonate, cyclic polyolefin, polyethylene terephthalate, or polyester, a thermosetting resin such as epoxy or silicone, or glass can be used, for example.

A thickness of the light guide member 10 is preferably in a range from 150 µm to 800 µm, for example. In the present specification, a thickness of each member represents a maximum value of a distance between an upper surface and a lower surface of each member in the third direction Z. The light guide member 10 may be formed of a single layer or may be formed of a layered body of a plurality of layers in the third direction Z. When the light guide member 10 is formed of a layered body, a light-transmissive adhesive layer may be disposed between layers. The layers of the layered body may use different kinds of chief materials. As a material of the adhesive layer, a thermoplastic resin such as acrylic, polycarbonate, cyclic polyolefin, polyethylene terephthalate, or polyester, or a thermosetting resin such as epoxy or silicone can be used, for example.

The light guide member 10 includes a first hole portion h1 penetrating from the first surface 11 to the second surface 12. As illustrated in FIG. 2, in the plan view, the first hole portion h1 can be, for example, circular. Further, in the plan view, the shape of the first hole portion h1 can be, for example, an ellipse, or a polygon such as a triangle, a quadrangle, a hexagon, or an octagon. In the present specification, the plan view means viewing from the third direction Z.

As described above, the light guide member 10 is formed with the grooves 14 that separate the light-emitting units 1 from each other. By forming the groove 14, for example, the warpage of the planar light source due to heat generation of the light source 20A can be suppressed. As illustrated in FIG. 3, the groove 14 includes a first groove portion 14a that is open to the first surface 11 side, and a second groove portion 14b that is open to the second surface 12 side. The first groove portion 14a and the second groove portion 14b communicate with each other in the third direction Z. A width of the first groove portion 14a is greater than a width of the second groove portion 14b. The width of the first groove portion 14a and the width of the second groove portion 14b are a width in a direction orthogonal to a direction in which the groove 14 extends.

A partition member 15 can be disposed in the first groove portion 14a. The partition member 15 has light reflectivity to the light emitted from the light source 20A. The partition member 15 is, for example, a resin member including light scattering particles. As the light scattering particles of the partition member 15, particles of titania, silica, alumina, zinc oxide, magnesium oxide, zirconia, yttria, calcium fluoride, magnesium fluoride, niobium pentoxide, barium titanate, tantalum pentoxide, barium sulfate, glass, or the like can be used, for example. As a resin material of the partition member 15, a thermoplastic resin such as an acrylic resin, a polycarbonate resin, a cyclic polyolefin resin, a polyethylene terephthalate resin, or a polyester resin, or a thermosetting resin such as an epoxy resin or a silicone resin can be used, for example. The partition member 15 may be a metal member such as aluminum and silver. For example, the partition member 15 is disposed in a film shape along an inside surface of the first groove portion 14a. The partition member 15 may fill the first groove portion 14a.

The partition member 15 suppresses light guide between adjacent light-emitting units 1. For example, light guide from the light-emitting unit 1 in a light-emitting state to the light-emitting unit 1 in a non-light-emitting state is suppressed by the partition member 15. Thus, when performing local dimming with each of the light-emitting units 1 as a driving unit, it is possible to easily control luminance for each of the light-emitting units 1.

In FIG. 3, the groove 14 penetrates from the first surface 11 to the second surface 12 of the light guide member 10. The groove 14 may be a bottomed groove having an opening portion on the first surface 11 side, and having a bottom that does not reach the second surface 12. The groove 14 may be a bottomed groove having an opening portion on the second surface 12 side, and having a bottom that does not reach the first surface 11. The groove 14 may be a hollow groove disposed inside the light guide member 10.

Light Source

The light source 20A is disposed in the first hole portion h1 of the light guide member 10. The first hole portion h1 is disposed in each of the plurality of light-emitting units 1. Consequently, the light source 20A is disposed in each of the plurality of light-emitting units 1.

The light source 20A includes a light-emitting element 21. The light-emitting element 21 includes a semiconductor layered body. The semiconductor layered body includes, for example, a substrate such as sapphire or gallium nitride, an n-type semiconductor layer and a p-type semiconductor layer disposed on the substrate, and a light-emitting layer interposed between the n-type semiconductor layer and the p-type semiconductor layer. Further, the light-emitting element 21 includes an n-side electrode electrically connected to the n-type semiconductor layer, and a p-side electrode electrically connected to the p-type semiconductor layer. Moreover, the light source 20A includes a pair of positive and negative electrodes 25 disposed on a lower surface side. One of the pair of electrodes 25 is electrically connected to the p-side electrode, and the other is electrically connected to the n-side electrode.

The semiconductor layered body from which the substrate is eliminated may be used. Further, a structure of the light-emitting layer may be a structure including a single active layer such as a double heterostructure and a single quantum well (SQW) structure, or a structure including an active layer group such as a multiple quantum well (MQW) structure. The light-emitting layer can emit visible light or ultraviolet light. The light-emitting layer can emit light that is visible from blue to red. As the semiconductor layered body including such a light-emitting layer, for example, $In_xAl_yGa_{1-x-y}N$ ($0 \leq x$, $0 \leq y$, $x+y \leq 1$) can be included. The semiconductor layered body can include at least one light-emitting layer that can achieve the light emission described above. For example, the semiconductor layered body may have a structure including one or more light-emitting layers between the n-type semiconductor layer and the p-type semiconductor layer, or may have a structure in which a structure including the n-type semiconductor layer, the light-emitting layer, and the p-type semiconductor layer in order is repeated multiple times. When the semiconductor layered body includes the plurality of light-emitting layers, the semiconductor layered body may include the light-emitting layers having different light emission peak wavelengths, or may include the light-emitting layers having the same light emission peak wavelength. Note that the same light emission peak wavelength may have a variation of approximately several nm, for example. A combination of such light-emitting layers can be selected as appropriate, and, for example, when the semiconductor layered body includes two light-emitting layers, the light-emitting layers can be selected from combinations of blue light and blue light, green light and green light, red light and red light, ultraviolet light and ultraviolet light, blue light and green light, blue light and red light, green light and red light, and the like. The light-emitting layer may include a plurality of active layers having different light emission peak wavelengths, or may include a plurality of active layers having the same light emission peak wavelength.

Figure 4:
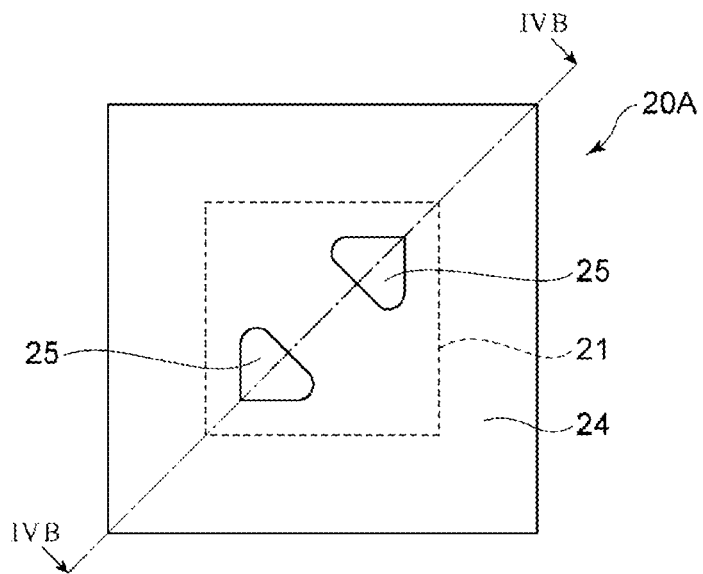
FIG. 4A is a schematic bottom view of a light source of the exemplary embodiments.
FIG. 4B is a schematic cross-sectional view taken along line IVB-IVB in FIG. 4A.
FIG. 4C is a schematic cross-sectional view illustrating a modified example of a light source of the exemplary embodiments.
FIG. 4D is a schematic cross-sectional view illustrating a modified example of a light source of the exemplary embodiments.
Figure 4:
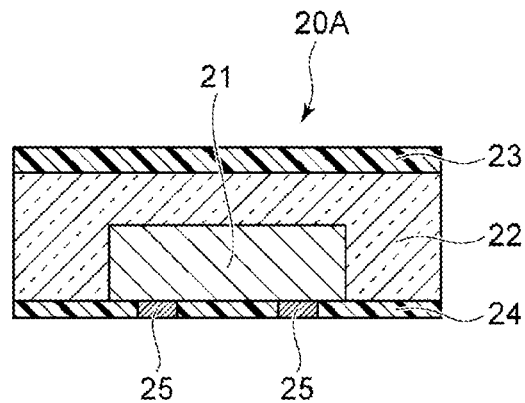
Figure 4:
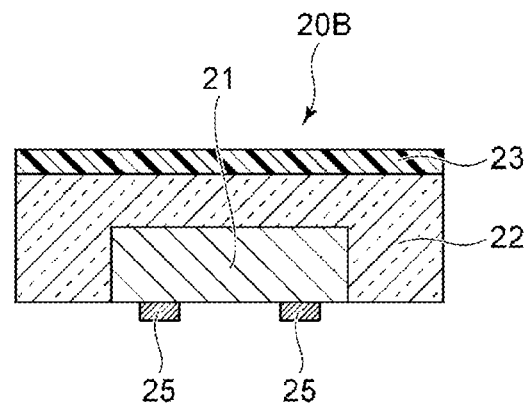
Figure 4:
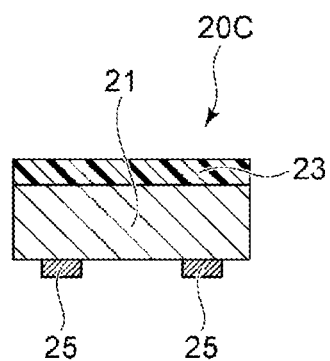

As illustrated in FIGS. 3 to 4B, the light source 20A can further include a second light-transmissive member 22. The second light-transmissive member 22 covers an upper surface and a lateral surface of the light-emitting element 21. The second light-transmissive member 22 protects the light-emitting element 21, and also has functions such as wavelength conversion and light diffusion according to particles added to the second light-transmissive member 22.

For example, the second light-transmissive member 22 includes a light-transmissive resin, and may further include a phosphor. For example, a silicone resin, an epoxy resin, or the like can be used as the light-transmissive resin. The phosphor can use an oxynitride based phosphor such as an yttrium aluminum garnet based phosphor (for example, $Y_3(Al,Ga)_5O_{12}:Ce$), a lutetium aluminum garnet based phosphor (for example, $Lu_3(Al,Ga)_5O_{12}:Ce$), a terbium aluminum garnet based phosphor (for example, $Tb_3(Al,Ga)_5O_{12}:Ce$), a CCA based phosphor (for example, $Ca_{10}(PO_4)_6Cl_2$:Eu), an SAE based phosphor (for example, $Sr_4Al_{14}O_{25}$:Eu), a chlorosilicate based phosphor (for example, $Ca_8MgSi_4O_{16}Cl_2$:Eu), a β-sialon based phosphor (for example, $(Si,Al)_3(O,N)_4$:Eu), or an α-sialon based phosphor (for example, $Ca(Si,Al)_{12}(O,N)_{16}$:Eu), a nitride based phosphor such as an SLA based phosphor (for example, $SrLiAl_3N_4$:Eu), a CASN based phosphor (for example, $CaAlSiN_3$:Eu), or an SCASN based phosphor (for example, $(Sr,Ca)AlSiN_3$:Eu), a fluoride based phosphor such as a KSF based phosphor (for example, $K_2SiF_6$:Mn), a KSAF based phosphor (for example, $K2Si_{0.99}Al_{0.01}F_{5.99}$:Mn), or an MGF based phosphor (for example, $3.5MgO \cdot 0.5MgF_2 \cdot GeO_2$:Mn), a phosphor having a perovskite structure (for example, $CsPb(F,Cl,Br,I)_3$), a quantum dot phosphor (for example, CdSe, InP, $AgInS_2$, or AgInSe2), or the like. As the phosphor added to the second light-transmissive member 22, one kind of a phosphor may be used, or a plurality of kinds of phosphors may be used.

The KSAF based phosphor may have a composition represented by Formula (I) below.

$$M_2[Si_pAl_qMn_rF_s] \quad (I)$$

In Formula (I), M represents an alkali metal and may include at least K. Mn may be a tetravalent Mn ion. p, q, r, and s may satisfy $0.9 \leq p+q+r \leq 1.1$, $0 < q \leq 0.1$, $0 < r \leq 0.2$, $5.9 \leq s \leq 6.1$. Preferably $0.95 \leq p+q+r \leq 1.05$ or $0.97 \leq p+q+r \leq 1.03$, $0 < q \leq 0.03$, $0.002 \leq q \leq 0.02$ or $0.003 \leq q \leq 0.015$, $0.005 \leq r \leq 0.15$, $0.01 \leq r \leq 0.12$ or $0.015 \leq r \leq 0.1$, $5.92 \leq s \leq 6.05$ or $5.95 \leq s \leq 6.025$. Examples thereof include compositions represented by $K_2[Si_{0.946}Al_{0.005}Mn_{0.049}F_{5.995}]$, $K_2[Si_{0.942}Al_{0.008}Mn_{0.050}F_{5.992}]$, $K_2[Si_{0.939}Al_{0.014}Mn_{0.047}F_{5.986}]$. According to such a KSAF based phosphor, it is possible to obtain red light emission having a high luminance and a narrow half-value width of the light emission peak wavelength.

Further, a wavelength conversion sheet containing the phosphor described above may be disposed on the planar light source. The wavelength conversion sheet can be used as a planar light source that absorbs a part of the blue light from the light source 20A, emits yellow light, green light, and/or red light, and emits white light. For example, white light can be acquired by combining the light source 20A that can emit blue light and the wavelength conversion sheet containing the phosphor that can emit yellow light. In addition, the light source 20A that can emit blue light and the wavelength conversion sheet containing a red phosphor and a green phosphor may be combined. Further, the light source 20A that can emit blue light and a plurality of wavelength conversion sheets may be combined. As the plurality of wavelength conversion sheets, for example, the wavelength conversion sheet containing the phosphor that can emit red light and the wavelength conversion sheet containing the phosphor that can emit green light can be selected. Further, the light source 20A including the light-emitting element 21 that can emit blue light and the second light-transmissive member 22 containing the phosphor that can emit red light may be combined with the wavelength conversion sheet containing the phosphor that can emit green light.

As a yellow phosphor used in the wavelength conversion sheet, the yttrium aluminum garnet based phosphor is preferably used, for example. Further, as a green phosphor used in the wavelength conversion sheet, for example, the phosphor having the perovskite structure or the quantum dot phosphor described above with a narrow half-value width of a light emission peak wavelength is preferably used. Further, as a red phosphor used in the wavelength conversion sheet, for example, the KSF based phosphor, the KSAF based phosphor, or the quantum dot phosphor described above with a narrow half-value width of a light emission peak wavelength is preferably used similarly to the green phosphor. Particularly, because the quantum dot phosphor has a short afterglow time, it can be suitably used as a planar light source that performs local dimming.

The light source 20A can further include a covering member 24. The covering member 24 is disposed on a lower surface of the light-emitting element 21. The covering member 24 is disposed such that a lower surface of the electrodes 25 of the light source 20A is exposed from the covering member 24. The covering member 24 is also disposed on a lower surface of the second light-transmissive member 22 covering the lateral surface of the light-emitting element 21.

The covering member 24 has light reflectivity to the light emitted from the light source 20A. The covering member 24 is, for example, a resin member containing light scattering particles. As the light scattering particles of the covering member 24, particles of titania, silica, alumina, zinc oxide, magnesium oxide, zirconia, yttria, calcium fluoride, magnesium fluoride, niobium pentoxide, barium titanate, tantalum pentoxide, barium sulfate, glass, or the like can be used, for example. As a resin material of the covering member 24, a thermoplastic resin such as an acrylic resin, a polycarbonate resin, a cyclic polyolefin resin, a polyethylene terephthalate resin, or a polyester resin, or a thermosetting resin such as an epoxy resin or a silicone resin can be used, for example.

The light source 20A can further include a second light-reflective member 23. The second light-reflective member 23 is disposed on an upper surface of the light source 20A. The second light-reflective member 23 covers the upper surface of the light-emitting element 21. The second light-reflective member 23 is disposed on an upper surface of the second light-transmissive member 22, and controls the amount and emission direction of light emitted from the upper surface of the second light-transmissive member 22. The second light-reflective member 23 has light reflectivity and is light-transmissive to light emitted from the light-emitting element 21. A part of the light emitted from the upper surface of the second light-transmissive member 22 is reflected by the second light-reflective member 23, and another part thereof is transmitted through the second light-reflective member 23. A transmittance of the second light-reflective member 23 with respect to the light emitted from the light-emitting element 21 is preferably in a range from 1% to 50% and more preferably in a range from 3% to 30%, for example. Thus, luminance directly above the light source 20A is reduced, and luminance unevenness of the planar light source is reduced.

The second light-reflective member 23 can be formed of a light-transmissive resin and light scattering particles contained in the light-transmissive resin. As the light-transmissive resin, a thermoplastic resin such as an acrylic resin, a polycarbonate resin, a cyclic polyolefin resin, a polyethylene terephthalate resin, or a polyester resin, or a thermosetting resin such as an epoxy resin or a silicone resin can be used, for example. As the light scattering particles, particles of titania, silica, alumina, zinc oxide, magnesium oxide, zirconia, yttria, calcium fluoride, magnesium fluoride, niobium pentoxide, barium titanate, tantalum pentoxide, barium sulfate, glass, or the like can be used, for example. The second light-reflective member 23 may be, for example, a metal member such as Al or Ag, or a dielectric multilayer film.

The light source may not include the covering member 24. For example, a light source 20B illustrated in FIG. 4C includes a lower surface formed of the lower surface of the light-emitting element 21 and the lower surface of the second light-transmissive member 22.

Further, a light source 20C may be the light-emitting element 21 alone. As illustrated in FIG. 4D, the second light-reflective member 23 may be disposed on the upper surface of the light-emitting element 21. Further, in FIG. 4D, in the light source 20C, the covering member 24 is not disposed on the lower surface of the light-emitting element 21; however, the covering member 24 may be disposed on the lower surface of the light-emitting element 21.

First Light-Transmissive Member

The first light-transmissive member 30 is disposed between a lateral surface of the light source 20A and the light guide member 10, and is disposed on the light source 20A, while being in the first hole portion h1 of the light guide member 10. The first light-transmissive member 30 covers the upper surface and the lateral surface of the light source 20A. The first light-transmissive member 30 is preferably in contact with the light guide member 10 and the light source 20A. In this way, the light from the light source 20A is easily guided to the light guide member 10.

The first light-transmissive member 30 is light-transmissive to the light emitted from the light source 20A. A transmittance of the first light-transmissive member 30 with respect to the peak wavelength of the light source 20A is preferably 50% or more and more preferably 70% or more, for example. For example, a resin can be used as a material of the first light-transmissive member 30. For example, as the material of the first light-transmissive member 30, the same resin as the material of the light guide member 10 or a resin having a small difference in refractive index from the material of the light guide member 10 can be used.

The first light-transmissive member 30 may be formed of a single layer or may be formed of a layered body of a plurality of layers in the third direction Z. The first light-transmissive member 30 may include a phosphor or a light diffusing material. When the first light-transmissive member 30 is a layered body, each layer may or may not include a phosphor and/or light diffusing material. For example, the first light-transmissive member 30 may be formed of a layer containing a phosphor and a layer that does not contain a phosphor.

First Light-Reflective Member

The first light-reflective member 40 is disposed on the first light-transmissive member 30. As illustrated in FIG. 2, the first light-reflective member 40 is disposed above the light source 20A via the first light-transmissive member 30. The first light-reflective member 40 may be in contact with the first light-transmissive member 30 and the light source 20A. The first light-reflective member 40 may be disposed above the first light-transmissive member 30 and the light source 20A via an adhesive resin. As the adhesive resin, a thermoplastic resin such as an acrylic resin, a polycarbonate resin, a cyclic polyolefin resin, a polyethylene terephthalate resin, or a polyester resin, or a thermosetting resin such as an epoxy resin or a silicone resin can be used, for example. As illustrated in FIG. 2, the first light-reflective member 40 is disposed in a position overlapping the first hole portion h1 in which the light source 20A and the first light-transmissive member 30 are disposed in the plan view.

The first light-reflective member 40 has light reflectivity and is light-transmissive to the light emitted from the light source 20A. A transmittance of the first light-reflective member 40 with respect to the peak wavelength of the light source 20A is preferably in a range from 1% to 50% and more preferably in a range from 3% to 30%, for example.

The first light-reflective member 40 can be formed of a light-transmissive resin and light scattering particles contained in the light-transmissive resin. As the light-transmissive resin, a thermoplastic resin such as an acrylic resin, a polycarbonate resin, a cyclic polyolefin resin, a polyethylene terephthalate resin, or a polyester resin, or a thermosetting resin such as an epoxy resin or a silicone resin can be used, for example. As the light scattering particles, particles of titania, silica, alumina, zinc oxide, magnesium oxide, zirconia, yttria, calcium fluoride, magnesium fluoride, niobium pentoxide, barium titanate, tantalum pentoxide, barium sulfate, glass, or the like can be used, for example. Further, in the first light-reflective member 40, the light-transmissive resin as described above may contain a plurality of air bubbles without containing light scattering particles. Further, the first light-reflective member 40 may be, for example, a metal member such as aluminum or silver, or a dielectric multilayer film.

An upper surface of the first light-reflective member 40 serves as a light-emitting surface (light exit surface) of the planar light source together with the first surface 11 of the light guide member 10. The first light-reflective member 40 reflects a part of the light traveling upward from the first hole portion h1 in which the light source 20A is disposed, and transmits the other part of the light. Thus, in the light-emitting surface of the planar light source, a difference between luminance of a region directly above and around the light source 20A and luminance of another region can be reduced. Thus, luminance unevenness on the light-emitting surface of the planar light source can be reduced.

The first light-transmissive member 30 is disposed between the first light-reflective member 40 and the second light-reflective member 23 of the light source 20A. The first light-transmissive member 30 has a higher transmittance with respect to the light emitted from the light source 20A than the transmittance of the first light-reflective member 40 and the second light-reflective member 23. The transmittance of the first light-transmissive member 30 with respect to the light emitted from the light source 20A can be set in a range from 2 times to 100 times the transmittance of the second light-reflective member 23 and the transmittance of the first light-reflective member 40 in a range of 100% or less. The light emitted from the lateral surface of the light source 20A, light reflected by a third light-reflective member 53 to be described below, and the like go around and are guided into the first light-transmissive member 30 between the first light-reflective member 40 and the second light-reflective member 23. Thus, a region directly above the light source 20A is not too bright and not too dark, and as a result, luminance unevenness on the light-emitting surface of the planar light source can be reduced.

Because the second light-reflective member 23 suppresses transmission of a part of the light emitted in a directly upward direction from the light source 20A, the transmittance of the first light-reflective member 40 is preferably higher than the transmittance of the second light-reflective member 23 with respect to the light emitted from the light source 20A in order to suppress the region directly above the light source 20A from becoming too dark.

Support Member

The support member 50 supports the light guide member 10 and the light source 20A. The light guide member 10 is disposed on the support member 50 with the second surface 12 facing an upper surface of the support member 50. The light source 20A is disposed on the support member 50 in the first hole portion h1.

The support member 50 includes a wiring substrate 60. The wiring substrate 60 includes an insulating base material 61, and a wiring layer 62 of at least one layer disposed on at least one surface of the insulating base material 61. The insulating base material 61 may be a rigid substrate, or may be a flexible substrate. The insulating base material 61 is preferably a flexible substrate in order to reduce a thickness of the planar light source. The insulating base material 61 may be formed of a single layer or may be formed of a layered body of a plurality of layers in the third direction Z. For example, the insulating base material 61 may be formed of a single-layer flexible substrate, or may be formed of a layered body of a plurality of rigid substrates. For example, a resin such as a polyimide can be used as a material of the insulating base material 61. The wiring layer 62 is a metal film, for example, a copper film.

The support member 50 further includes a first adhesive layer 51 disposed on the wiring substrate 60, the third light-reflective member 53 disposed on the first adhesive layer 51, and a second adhesive layer 52 disposed on the third light-reflective member 53.

The first adhesive layer 51 is disposed on a surface of the insulating base material 61 on a side opposite to the surface on which the wiring layer 62 is disposed. The first adhesive layer 51 is disposed between the insulating base material 61 and the third light-reflective member 53, and adheres the insulating base material 61 and the third light-reflective member 53. The first adhesive layer 51 is, for example, a resin layer containing light scattering particles. As the light scattering particles, particles of titania, silica, alumina, zinc oxide, magnesium oxide, zirconia, yttria, calcium fluoride, magnesium fluoride, niobium pentoxide, barium titanate, tantalum pentoxide, barium sulfate, glass, or the like can be used, for example. As the resin of the first adhesive layer 51, a thermoplastic resin such as an acrylic resin, a polycarbonate resin, a cyclic polyolefin resin, a polyethylene terephthalate resin, or a polyester resin, or a thermosetting resin such as an epoxy resin or a silicone resin can be used, for example.

The third light-reflective member 53 is disposed below the second surface 12 of the light guide member 10, below the light source 20A, below the first light-transmissive member 30, and below the groove 14. The third light-reflective member 53 has light reflectivity to the light emitted from the light source 20A. As the third light-reflective member 53, a resin member including a large number of air bubbles or a resin member including light scattering particles can be used, for example. The resin of the third light-reflective member 53 can be selected from, for example, the resins listed as the resins that can be used for the first adhesive layer 51 described above. The light scattering particles can be selected from, for example, the light scattering particles listed as the light scattering particles that can be used for the first adhesive layer 51 described above.

In a region between the third light-reflective member 53 and the first surface 11 of the light guide member 10, the light from the light source 20A is repeatedly reflected by the third light-reflective member 53 and the first surface 11 and is guided in the light guide member 10 toward the groove 14. A part of the light toward the first surface 11 is extracted from the first surface 11 to the outside of the light guide member 10. A part of the light toward the second surface 12 is reflected to the first surface 11 side by the third light-reflective member 53, and thus luminance of the light extracted from the first surface 11 can be improved. The third light-reflective member 53 preferably uses a resin member containing a large number of air bubbles. The amount of light reflected by the third light-reflective member 53 is improved, and the light from the light source 20A is easily guided into the light guide member 10 toward the groove 14. Moreover, when light reflectivity is provided to the first adhesive layer 51 disposed on the lower surface of the third light-reflective member 53, luminance of the light extracted from the first surface 11 can be further improved.

The second adhesive layer 52 is disposed between the third light-reflective member 53 and the second surface 12 of the light guide member 10, and adheres the third light-reflective member 53 and the light guide member 10. The light source 20A is disposed on the second adhesive layer 52 in the first hole portion h1 of the light guide member 10. The second adhesive layer 52 is light-transmissive to the light emitted from the light source 20A. The material of the second adhesive layer 52 can be selected from, for example, the resins listed in the resins that can be used for the first adhesive layer 51 described above. Further, the second adhesive layer 52 may include light scattering particles, and the light scattering particles can be selected from, for example, the light scattering particles listed as the light scattering particles that can be used for the first adhesive layer 51 described above.

The support member 50 further includes a conductive member 70. The conductive member 70 includes, for example, a resin and metal particles included in the resin. As the resin of the conductive member 70, an epoxy resin or a phenol resin can be used, for example. For example, particles of copper or silver can be used as the metal particles.

The conductive member 70 includes a connection portion 71 and a wiring portion 72. The connection portion 71 penetrates the second adhesive layer 52, the third light-reflective member 53, the first adhesive layer 51, and the insulating base material 61 in the third direction Z. The wiring portion 72 is disposed on a surface of the wiring substrate 60 where the wiring layer 62 is disposed, and is connected to the connection portion 71. The connection portion 71 and the wiring portion 72 can be integrally formed of the same material, for example. A portion 72a of the wiring portion 72 is connected to the wiring layer 62.

A pair of the conductive members 70 are separated from each other corresponding to the pair of positive and negative electrodes 25 of the light source 20A. The connection portion 71 of one of the conductive members 70 is connected to the positive electrode 25 below the light source 20A, and the connection portion 71 of the other conductive member 70 is connected to the negative electrode 25 below the light source 20A. The electrode 25 of the light source 20A is electrically connected to the conductive member 70 and the wiring layer 62.

The support member 50 further includes an insulating layer 54. The insulating layer 54 covers and protects the surface of the wiring substrate 60 where the wiring layer 62 is disposed, the wiring layer 62, and the conductive member 70.

Figure 5:
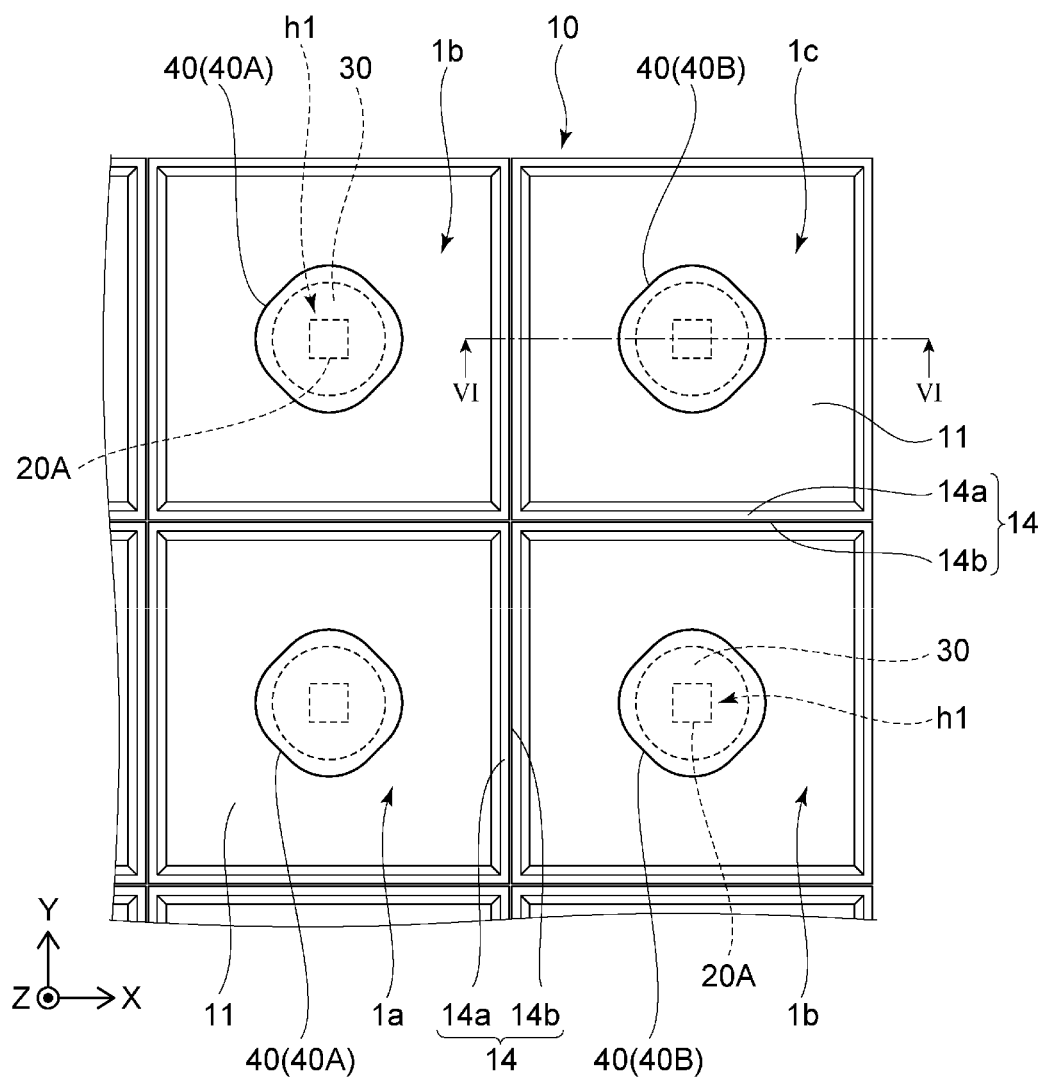
FIG. 5 is a schematic top view of a portion B in FIG. 1.
Figure 6:
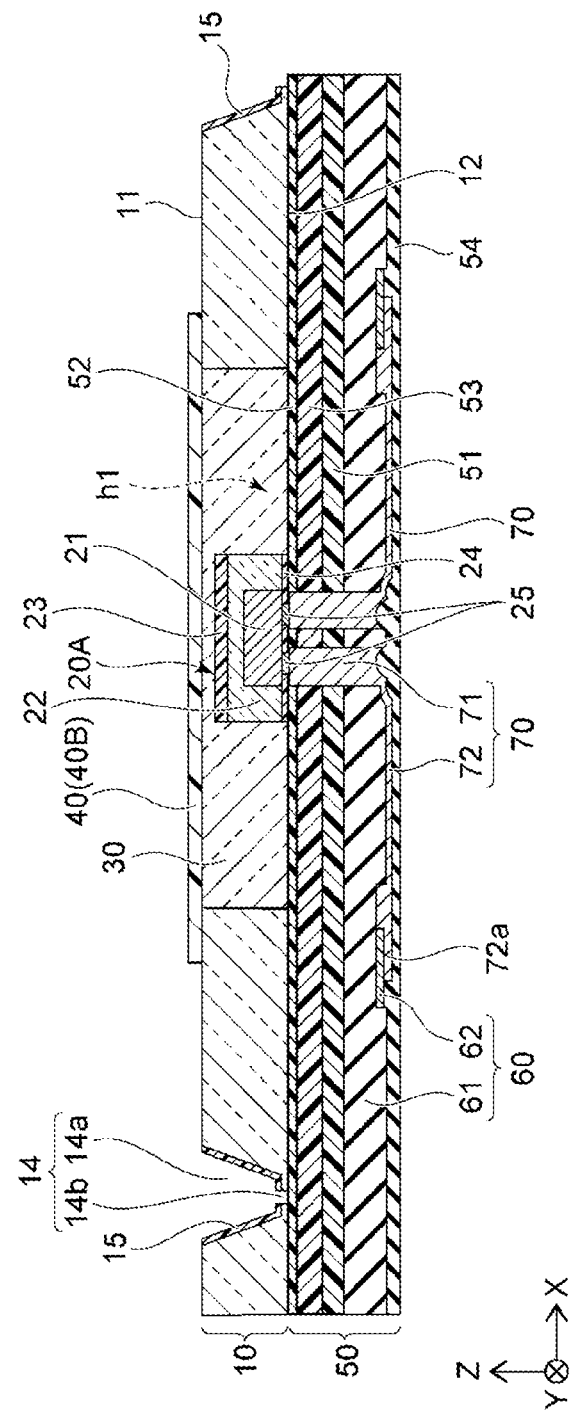
FIG. 6 is a schematic cross-sectional view taken along line VI-VI in FIG. 5.

FIG. 5 is a schematic top view of a portion B in FIG. 1. The portion B is a portion including one outer portion 1c disposed at the corner of the light guide member 10, one outer portion 1b adjacent to the outer portion 1c in the first direction X, one outer portion 1b adjacent to the outer portion 1c in the second direction Y, and one inner portion 1a adjacent to the outer portion 1c in the oblique direction inclined with respect to the first direction X and the second direction Y among the light-emitting units 1. FIG. 6 is a schematic cross-sectional view taken along line VI-VI in FIG. 5, and is a schematic cross-sectional view of the planar light source in the outer portion 1c. Note that the outer portion 1b can have the same configuration as the outer portion 1c.

The outer portion 1b and the outer portion 1c can include the same member as the inner portion 1a described above with reference to FIG. 3. Note that lateral surfaces (lateral surface on the right side in FIG. 6) of the outer portion 1b and the outer portion 1c on the sides where other light-emitting units 1 are not adjacent to each other each have a configuration in which the groove 14 is cut at a half position in the width direction of the groove 14.

Moreover, as a difference between the outer portion 1b and the inner portion 1a and a difference between the outer portion 1c and the inner portion 1a, there is a difference in brightness in an individual light-emitting state. The brightness of one outer portion 1b is higher than the brightness of one inner portion 1a. The brightness of one outer portion 1c is higher than the brightness of one inner portion 1a. The brightness represents the brightness in a state in which the same power is supplied to the light sources 20A disposed on the outer portion 1b, the outer portion 1c, and the inner portion 1a, respectively, and one outer portion 1b, one outer portion 1c, and one inner portion 1a are individually allowed to emit light.

For example, the brightness of the light-emitting unit 1 can be measured by a spectral luminance meter. When the spectral luminance meter is installed above one light-emitting unit 1, power is supplied to the light source 20A to measure the luminance.

In the plan view, the number of light-emitting units 1 adjacent to one outer portion 1b and the number of light-emitting units 1 adjacent to one outer portion 1c are less than the number of light-emitting units 1 adjacent to one inner portion 1a. Accordingly, the amount of light entering the one outer portion 1b from the adjacent light-emitting units 1 and the amount of light entering the one outer portion 1c from the adjacent light-emitting units 1 are less than the amount of light entering the one inner portion 1a from the adjacent light-emitting units 1. Therefore, in an entire light-emitting state in which all the light-emitting units 1 are allowed to emit light, the outer peripheral side of the light guide member 10 in which the outer portion 1b and the outer portion 1c are disposed tends to be darker than the region where the inner portion 1a is disposed.

As will be described in detail below, according to the embodiment, in a state in which one outer portion 1b, one outer portion 1c, and one inner portion 1a are individually allowed to emit light with the same power, the brightness of one outer portion 1b and the brightness of one outer portion 1c are made higher than the brightness of one inner portion 1a by varying, for example, the covering ratio of the first light-reflective member 40 covering the light-emitting unit 1, the thickness of the first light-reflective member 40, the concentration of the light scattering particles in the first light-reflective member 40, and the like. Thus, it is possible to compensate for a decrease in the brightness on the outer peripheral side in the entire light-emitting state, and it is possible to reduce luminance unevenness on the light-emitting surface of the planar light source.

For example, the brightness of one inner portion 1a can be the brightness of at least the inner portion 1a closest to the center of the light guide member 10 in the plan view illustrated in FIG. 1. The center of the light guide member 10 is located at an intersection of two diagonal lines of the light guide member 10 in the plan view. In the plan view, when the inner portion 1a overlaps the center of the light guide member 10, this inner portion 1a is the inner portion 1a closest to the center of the light guide member 10. In the plan view, when the center of the light guide member 10 does not overlap the inner portion 1a, the inner portion 1a having an outer edge (lateral surface adjacent to the groove 14) closest to the center of the light guide member 10 is the inner portion 1a closest to the center of the light guide member 10. In this case, there may be a plurality of inner portions 1a closest to the center of the light guide member 10, but any of the plurality of inner portions 1a may be the inner portions 1a closest to the center of the light guide member 10.

One outer portion 1b brighter than one inner portion 1a is one outer portion 1b selected from the plurality of outer portions 1b. One outer portion 1c brighter than one inner portion 1a is one outer portion 1c selected from the plurality of outer portions 1c. The number of outer portions 1b brighter than one inner portion 1a and the number of outer portions 1c brighter than one inner portion 1a may also be multiple. The brightness of all the outer portions 1b and the brightness of all the outer portions 1c may also be higher than the brightness of one inner portion 1a. In this case, it is possible to further reduce luminance unevenness on the light-emitting surface of the planar light source in the entire light-emitting state.

In order to further reduce luminance unevenness on the light-emitting surface of the planar light source, for example, the brightness of one outer portion 1b and the brightness of one outer portion 1c are preferably set in a range from 1.3 times to 3 times the brightness of one inner portion.

Further, among the outer portions 1b and the outer portions 1c, the number of light-emitting units 1, to which one outer portion 1c located at the corner of the light guide member 10 is adjacent, is smaller than the number of light-emitting units 1 to which one outer portion 1b located at a position other than the corner is adjacent. Therefore, in the entire light-emitting state, among the outer peripheral portions of the light guide member 10, the brightness of the corner tends to be dark. Therefore, in a state in which one outer portion 1b and one outer portion 1c are individually allowed to emit light with the same power, it is preferable that the brightness of one outer portion 1c located at the corner is higher than the brightness of one outer portion 1b located at a position other than the corner.

Note that among the plurality of inner portions 1a, the brightness in the individual light-emitting state may be different in accordance with the distance from the outer portion 1b. For example, the brightness of the inner portion 1a adjacent to the outer portion 1b in the individual light-emitting state can be made higher than the brightness of the inner portion 1a closest to the center of the light guide member 10 in the individual light-emitting state. Thus, in the entire light-emitting state, light from the inner portion 1a adjacent to the outer portion 1b can compensate for a decrease in the brightness of the outer portion 1b and reduce luminance unevenness on the light-emitting surface of the planar light source.

Further, among the plurality of inner portions 1a, the brightness in the individual light-emitting state may be different in accordance with the distance from the outer portion 1c. For example, the brightness of the inner portion 1a adjacent to the outer portion 1c in the individual light-emitting state can be made higher than the brightness of the inner portion 1a closest to the center of the light guide member 10 in the individual light-emitting state. Thus, in the entire light-emitting state, light from the inner portion 1a adjacent to the outer portion 1c can compensate for a decrease in the brightness of the outer portion 1c and reduce luminance unevenness on the light-emitting surface of the planar light source.

As illustrated in FIGS. 2 and 5, in one light-emitting unit 1, the first light-reflective member 40 can overlap and continuously cover all of the light source 20A and the first hole portion h1 in the plan view.

Figure 7:
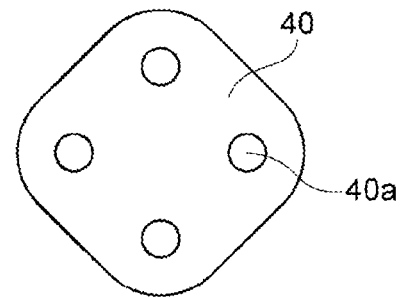
FIG. 7A is a schematic top view of an exemplary first light-reflective member 40 of the exemplary embodiments.
FIG. 7B is a schematic top view of another exemplary first light-reflective member 40 of the exemplary embodiments.
FIG. 7C is a schematic top view of another exemplary first light-reflective member 40 of the exemplary embodiments.
Figure 7:
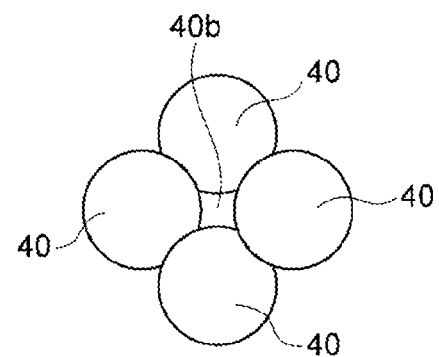
Figure 7:
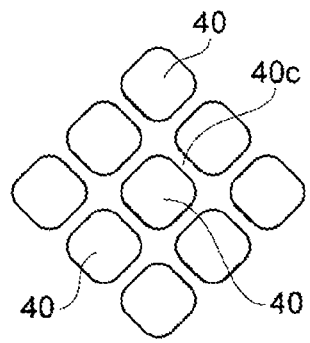

As illustrated in FIG. 7A, the first light-reflective member 40 may has opening portions 40a. Further, as illustrated in FIG. 7B, the first light-reflective member 40 may be disposed in a plurality of dot shapes, and a gap 40b in which no first light-reflective member 40 is disposed in a region surrounded by the plurality of dot-shaped first light-reflective members 40 may be formed. Further, as illustrated in FIG. 7C, a plurality of first light-reflective members 40 may be disposed with gaps 40c so that a plurality of dots do not overlap. The first light-reflective member 40 can be formed, for example, by applying. The first light-reflective member 40 may be formed for each dot or may be formed by printing a plurality of dots at a time. When the first light-reflective member 40 is formed by printing a plurality of dots at a time, for example, the first light-reflective member 40 illustrated in FIG. 7B is less likely to have a thickness variation even in a region where the plurality of dots overlap.

In the first light-reflective member 40, the first light-reflective member 40 disposed on the inner portion 1a is referred to as an inner light-reflective member 40A (illustrated in FIG. 3). In the first light-reflective member 40, the first light-reflective member 40 disposed on the outer portion 1b and/or the outer portion 1c is referred to as an outer light-reflective member 40B (illustrated in FIG. 6). In FIGS. 7A to 7C, the inner light-reflective member 40A and the outer light-reflective member 40B may be indicated as the first light-reflective member 40 without distinction.

The following describes embodiments for making the brightness of one outer portion 1b and the brightness of one outer portion 1c higher than the brightness of one inner portion 1a in a state in which the one outer portion 1b, the one outer portion 1c, and the one inner portion 1a are individually allowed to emit light with the same power. According to the embodiments, as will be described below, the brightness of one outer portion 1b, and the brightness of one outer portion 1c can be made higher than the brightness of one inner portion 1a, so that luminance unevenness on the light-emitting surface of the planar light source in the entire light-emitting state can be reduced. Note that the embodiments can be implemented independently, or two or more of the embodiments can be combined and implemented.

First Embodiment

According to the first embodiment, in a plan view, the covering ratio of the outer light-reflective member 40B covering the outer portion 1b (or an area of the outer light-reflective member 40B per unit area in the outer portion 1b) is smaller than the covering ratio of the inner light-reflective member 40A covering the inner portion 1a (or an area of the inner light-reflective member 40A per unit area in the inner portion 1a). Thus, the amount of light extracted above the outer portion 1b can be greater than the amount of light extracted above the inner portion 1a, and the brightness of one outer portion 1b can be higher than the brightness of one inner portion 1a in the individual light-emitting state.

Further, in the plan view, the covering ratio of the outer light-reflective member 40B covering the outer portion 1c (or an area of the outer light-reflective member 40B per unit area in the outer portion 1c) is smaller than the covering ratio of the inner light-reflective member 40A covering the inner portion 1a (or an area of the inner light-reflective member 40A per unit area in the inner portion 1a). Thus, the amount of light extracted above the outer portion 1c can be greater than the amount of light extracted above the inner portion 1a, and the brightness of one outer portion 1c can be higher than the brightness of one inner portion 1a in the individual light-emitting state.

For example, the inner light-reflective member 40A may not be formed with the opening portion 40a illustrated in FIG. 7A, the gap 40b illustrated in FIG. 7B, and the gap 40c illustrated in FIG. 7C, and the outer light-reflective member 40B can be formed with the opening portion 40a, the gap 40b, and the gap 40c. Further, the number of opening portions 40a, gaps 40b, and gaps 40c formed in the outer light-reflective member 40B can be made greater than the number of opening portions 40a, gaps 40b, and gaps 40c formed in the inner light-reflective member 40A. Further, the size of each of the opening portion 40a, the gap 40b, and the gap 40c formed in the outer light-reflective member 40B can be made greater than the size of each of the opening portion 40a, the gap 40b, and the gap 40c formed in the inner light-reflective member 40A. Further, the number of opening portions 40a, gaps 40b, and gaps 40c formed in the outer light-reflective member 40B can be made greater than the number of opening portions 40a, gaps 40b, and gaps 40c formed in the inner light-reflective member 40A, and the size of each of the opening portion 40a, the gap 40b, and the gap 40c formed in the outer light-reflective member 40B can be made greater than the size of each of the opening portion 40a, the gap 40b, and the gap 40c formed in the inner light-reflective member 40A.

Second Embodiment

According to the second embodiment, by making the light transmittance of the outer light-reflective member 40B higher than the light transmittance of the inner light-reflective member 40A, the brightness of one outer portion 1b can be higher than the brightness of one inner portion 1a and the brightness of one outer portion 1c can be higher than the brightness of one inner portion 1a in the individual light-emitting state.

For example, by making the thickness of the outer light-reflective member 40B illustrated in FIG. 6 thinner than the thickness of the inner light-reflective member 40A illustrated in FIG. 3, the light transmittance of the outer light-reflective member 40B can be made higher than the light transmittance of the inner light-reflective member 40A. Further, by making the concentration of the light scattering particles contained in the outer light-reflective member 40B lower than the concentration of the light scattering particles contained in the inner light-reflective member 40A, the light transmittance of the outer light-reflective member 40B can be made higher than the light transmittance of the inner light-reflective member 40A. When the concentration of the light scattering particles contained in the outer light-reflective member 40B is lower than the concentration of the light scattering particles contained in the inner light-reflective member 40A, the outer light-reflective member 40B may include no light scattering particles. The concentration of the light scattering particles contained in the inner light-reflective member 40A and the concentration of the light scattering particles contained in the outer light-reflective member 40B can be set in a range from 20% by weight to 30% by weight, for example. The difference between the concentration of the light scattering particles contained in the outer light-reflective member 40B and the concentration of the light scattering particles contained in the inner light-reflective member 40A can be set within, for example, 5% by weight. Further, by making the thickness of the outer light-reflective member 40B thinner than the thickness of the inner light-reflective member 40A and making the concentration of the light scattering particles contained in the outer light-reflective member 40B lower than the concentration of the light scattering particles contained in the inner light-reflective member 40A, the light transmittance of the outer light-reflective member 40B can be made higher than the light transmittance of the inner light-reflective member 40A.

Third Embodiment

Figure 8:
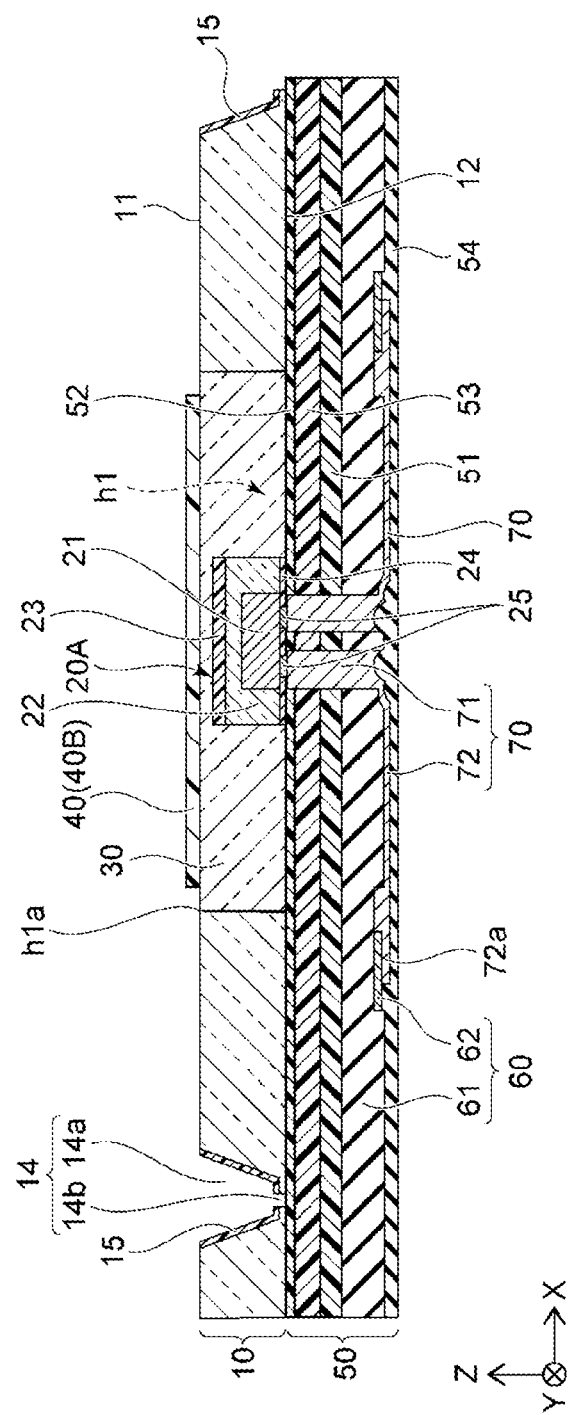
FIG. 8 is a schematic cross-sectional view of an outer portion of a third embodiment.

According to the third embodiment, as illustrated in FIG. 2, in the plan view, the inner light-reflective member 40A covers an outer edge h1a of the first hole portion h1 that defines the first hole portion h1. On the other hand, in the plan view, the outer edge h1a of the first hole portion h1 that defines the first hole portion h1 around the outer light-reflective member 40B is exposed. As illustrated in FIG. 8, in a cross-sectional view, the outer edge h1a of the first hole portion h1 that defines the first hole portion h1 around the outer light-reflective member 40B is exposed. An end portion of the outer light-reflective member 40B may be covered by the first light-transmissive member 30.

At a boundary between the first light-transmissive member 30 and the light guide member 10, reflection and refraction of light may occur and light heading upward may increase depending on a difference in refractive index between the first light-transmissive member 30 and the light guide member 10. That is, luminance in the vicinity of the outer edge h1a of the first hole portion h1 located at an upper end of the boundary between the first light-transmissive member 30 and the light guide member 10 may increase. Consequently, because the inner light-reflective member 40A covers the outer edge h1a of the first hole portion h1 and the outer edge h1a of the first hole portion h1 in the outer light-reflective member 40B is exposed, the brightness of one outer portion 1b can be made higher than the brightness of one inner portion 1a and the brightness of one outer portion 1c can be made higher than the brightness of one inner portion 1a in the individual light-emitting state.

Further, in the outer portion 1b or the outer portion 1c illustrated in FIG. 8, the upper surface of the first light-transmissive member 30 has a region not covered by the outer light-reflective member 40B. In the region, light from the first light-transmissive member 30 is extracted upward without transmitting the outer light-reflective member 40B. Thus, the brightness of one outer portion 1b can be made higher than the brightness of one inner portion 1a and the brightness of one outer portion 1c can be made higher than the brightness of one inner portion 1a in the individual light-emitting state.

Fourth Embodiment

According to the fourth embodiment, the concentration of the light diffusing material in the first light-transmissive member 30 at the outer portion 1b and/or the outer portion 1c is made higher than the concentration of the light diffusing material in the first light-transmissive member 30 at the inner portion 1a. In this case, the concentration of the light diffusing material in the first light-transmissive member 30 at the inner portion 1a may be 0, that is, the first light-transmissive member 30 at the inner portion 1a may not contain the light diffusing material. The concentration of the light diffusing material in the first light-transmissive member 30 at the outer portion 1b and/or the outer portion 1c is in a range from 0.1% by weight to 2% by weight, for example. The concentration of the light diffusing material in the first light-transmissive member 30 at the inner portion 1a is in a range from 0% by weight to 0.1% by weight, for example. According to the fourth embodiment, light traveling in various directions can be incident on the outer light-reflective member 40B by diffuse reflection in the first light-transmissive member 30 at the outer portion 1b and/or the outer portion 1c. Thus, at the outer portion 1b and/or the outer portion 1c, the amount of light extracted above the outer portion 1b and/or the outer portion 1c without being reflected at an interface between the first light-transmissive member 30 and the outer light-reflective member 40B can be greater than the amount of light at the inner portion 1a. As a result, the brightness of one outer portion 1b can be made higher than the brightness of one inner portion 1a and the brightness of one outer portion 1c can be made higher than the brightness of one inner portion 1a in the individual light-emitting state.

Fifth Embodiment

According to the fifth embodiment, the brightness of the light source 20A itself at the outer portion 1b and/or the outer portion 1c is made higher than the brightness of the light source 20A itself at the inner portion 1a, so that the brightness of one outer portion 1b can be made higher than the brightness of one inner portion 1a and the brightness of one outer portion 1c can be made higher than the brightness of one inner portion 1a in the individual light-emitting state. For example, in a state in which the same power is supplied, the light source 20A with high output is disposed at the outer portion 1b and/or the outer portion 1c, and the light source 20A with lower output than the light source 20A disposed at the outer portion 1b and/or the outer portion 1c is disposed at the inner portion 1a, so that the brightness of the light source 20A at the outer portion 1b and/or the outer portion 1c can be made higher than the brightness of the light source 20A at the inner portion 1a. Further, for example, the size of the light source 20A at the outer portion 1b and/or the outer portion 1c is made greater than the size of the light source 20A at the inner portion 1a, so that the brightness of the light source 20A at the outer portion 1b and/or the outer portion 1c can be made higher than the brightness of the light source 20A at the inner portion 1a.

Sixth Embodiment

Figure 9:
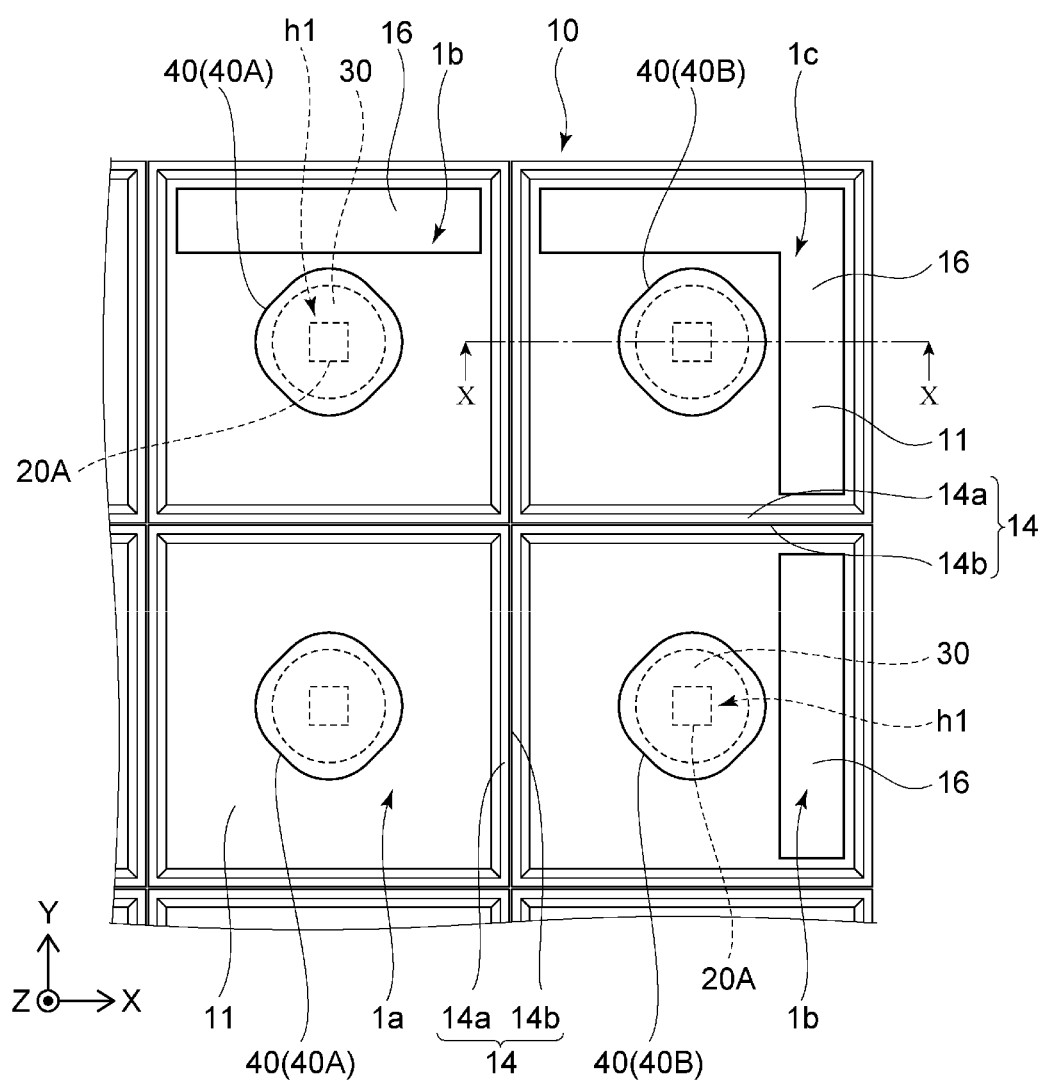
FIG. 9 is a schematic top view of an outer portion of a sixth embodiment.

FIG. 9 is a schematic top view of the portion B of FIG. 1 in a planar light source of the sixth embodiment.

Figure 10:
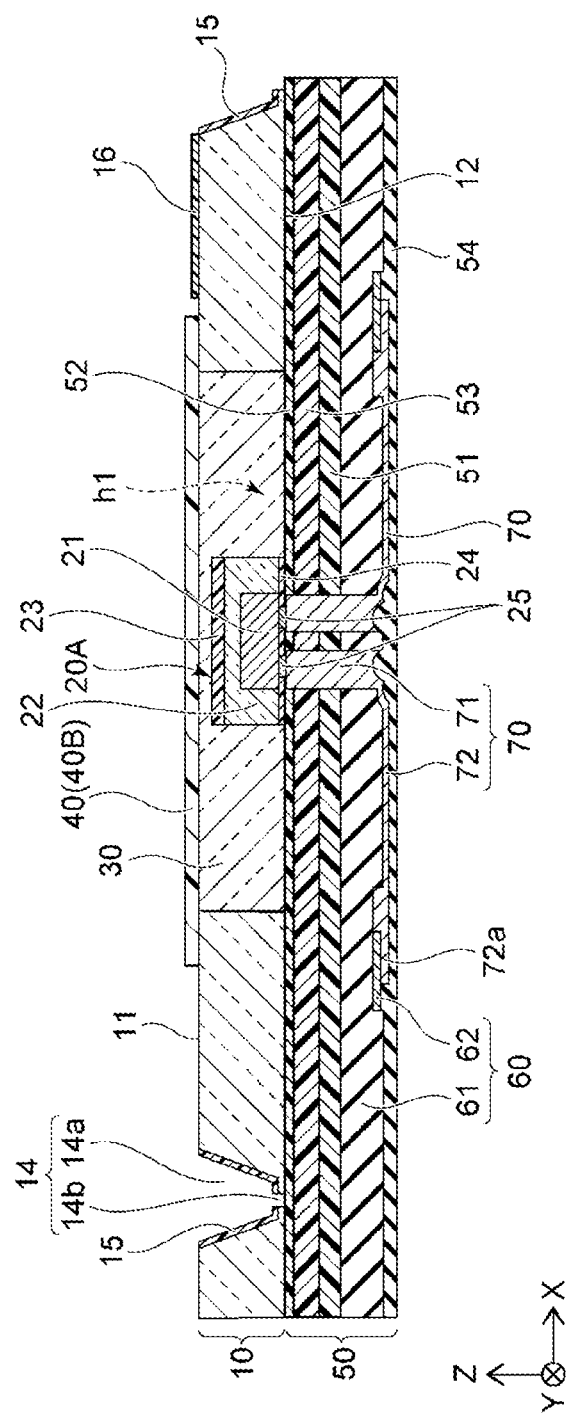
FIG. 10 is a schematic cross-sectional view taken along line X-X in FIG. 9.

FIG. 10 is a schematic cross-sectional view taken along line X-X in FIG. 9.

According to the sixth embodiment, a third light-transmissive member 16 is disposed on the upper surface of the outer portion 1b and/or the outer portion 1c (the first surface 11 of the light guide member 10). The third light-transmissive member 16 is disposed between the light source 20A at one outer portion 1b and/or one outer portion 1c and an outer surface of another outer portion 1b and/or another outer portion 1c in the plan view. The outer surface of the outer portion 1b and/or the outer portion 1c is a lateral surface on the side where there are no adjacent light-emitting units 1, and extends along the first direction X and the second direction Y to form an outer edge of the planar light source. The third light-transmissive member 16 is continuously disposed along the first direction X and the second direction Y except for the position of the groove 14. Alternatively, the third light-transmissive member 16 may be intermittently disposed along the first direction X and the second direction Y to cover the groove 14.

The third light-transmissive member 16 is a resin member light-transmissive to light emitted from the light source 20A. As a resin material of the third light-transmissive member 16, a thermoplastic resin such as an acrylic resin, a polycarbonate resin, a cyclic polyolefin resin, a polyethylene terephthalate resin, or a polyester resin, or a thermosetting resin such as an epoxy resin or a silicone resin can be used, for example. The refractive index of the resin member of the third light-transmissive member 16 is smaller than the refractive index of the light guide member 10 and is greater than the refractive index of the air. That is, the third light-transmissive member 16 having a refractive index between the refractive index of the light guide member 10 and the refractive index of the air is disposed between the first surface 11 of the light guide member 10 and the air at the outer portion 1b and/or the outer portion 1c. Thus, compared with a case in which the first surface 11 of the light guide member 10 is directly in contact with the air, the total reflection on an optical path between the first surface 11 of the light guide member 10 and the air can be reduced and the amount of light extracted upward from the upper surface of the outer portion 1b and/or the outer portion 1c can be increased. As a result, the brightness of one outer portion 1b can be made higher than the brightness of one inner portion 1a and the brightness of one outer portion 1c can be made higher than the brightness of one inner portion 1a in the individual light-emitting state.

The third light-transmissive member 16 can further contain light scattering particles. Light can be diffused by the light scattering particles to further increase the amount of light extracted above the third light-transmissive member 16. For example, a member having the same configuration as the partition member 15 disposed in the groove 14 can be used as the third light-transmissive member 16. For example, the thickness of the third light-transmissive member 16 can be set in a range from 5 µm to 30 µm, and as light scattering particles in the third light-transmissive member 16, the concentration of titanium oxide can be set in a range from 40% by weight to 70% by weight, for example.

Figure 11:
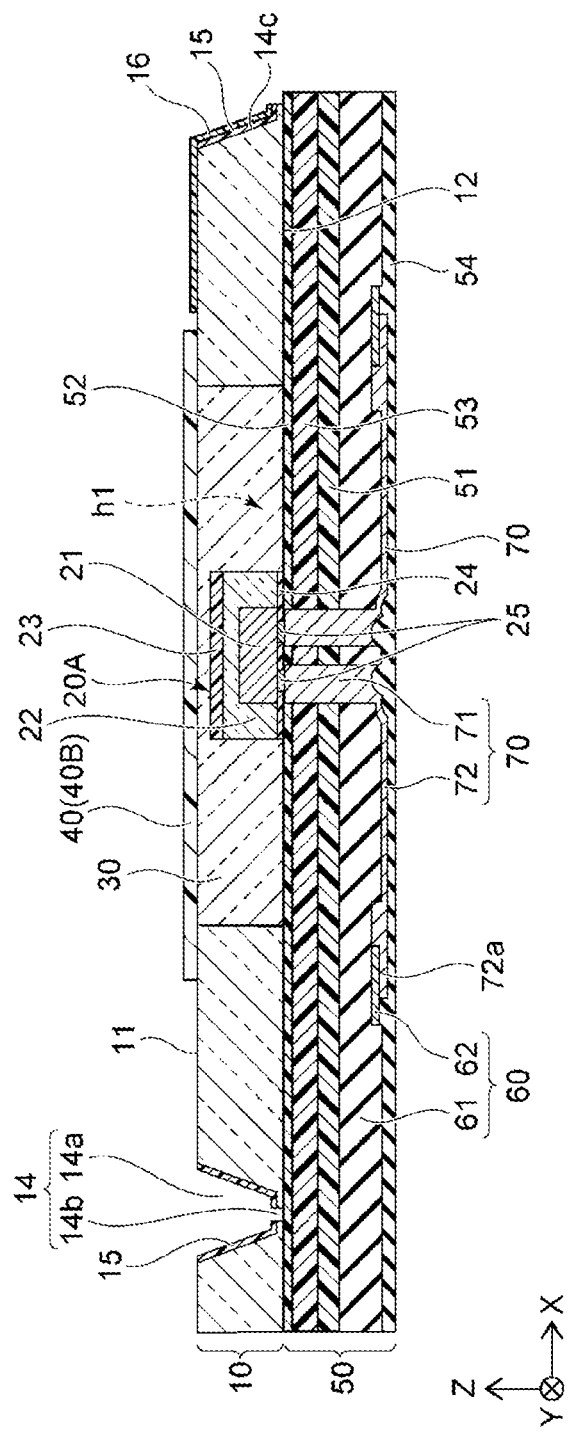
FIG. 11 is a schematic cross-sectional view of the outer portion of the sixth embodiment.

As illustrated in FIG. 11, the third light-transmissive member 16 can be disposed so as to cover the partition member 15 disposed on an outer surface 14c of the outer portion 1b and/or the outer portion 1c. Thus, the amount of light returned by reflection from the outer surface 14c side into the light guide member 10 can be increased, and the light returned from the outer surface 14c side can be further reflected on the second surface 12 side and directed upward. This can further increase the amount of light extracted above the outer portion 1b and/or the outer portion 1c.

The outer surface 14c is one lateral surface, of a pair of lateral surfaces that define the groove 14, that is left by the cutting of the groove 14. Therefore, the partition member 15 is already disposed on the outer surface 14c, and the third light-transmissive member 16 is further disposed to cover the partition member 15. The same material can be used for the partition member 15 and the third light-transmissive member 16, and the thickness of the light-transmissive member (the partition member 15 and the third light-transmissive member 16) disposed on the outer surface 14c of the outer portion 1b and/or the outer portion 1c is thicker than the thickness of the third light-transmissive member 16 disposed on the upper surface of the outer portion 1b and/or the outer portion 1c. By thickening the light-transmissive member of the outer surface 14c of the outer portion 1b and/or the outer portion 1c, light returned from the outer surface 14c into the light guide member 10 can be further increased, so that the amount of light extracted above the outer portion 1b and/or the outer portion 1c can be further increased.

The third light-transmissive member 16 may be disposed on the lower surface of the outer portion 1b and/or the outer portion 1c (the second surface 12 of the light guide member 10). Similar to the third light-transmissive member 16 disposed on the upper surface of the outer portion 1b and/or the outer portion 1c, the third light-transmissive member 16 disposed on the lower surface of the outer portion 1b and/or the outer portion 1c can also be disposed between the light source 20A on the outer portion 1b and/or the outer portion 1c and the outer surface of the outer portion 1b and/or the outer portion 1c in the plan view. The third light-transmissive member 16 disposed on the lower surface of the outer portion 1b and/or the outer portion 1c preferably contains light scattering particles. Thus, the amount of light extracted above the outer portion 1b and/or the outer portion 1c can be increased by diffuse reflection in the third light-transmissive member 16 disposed on the lower surface of the outer portion 1b and/or the outer portion 1c.

Seventh Embodiment

Figure 12:
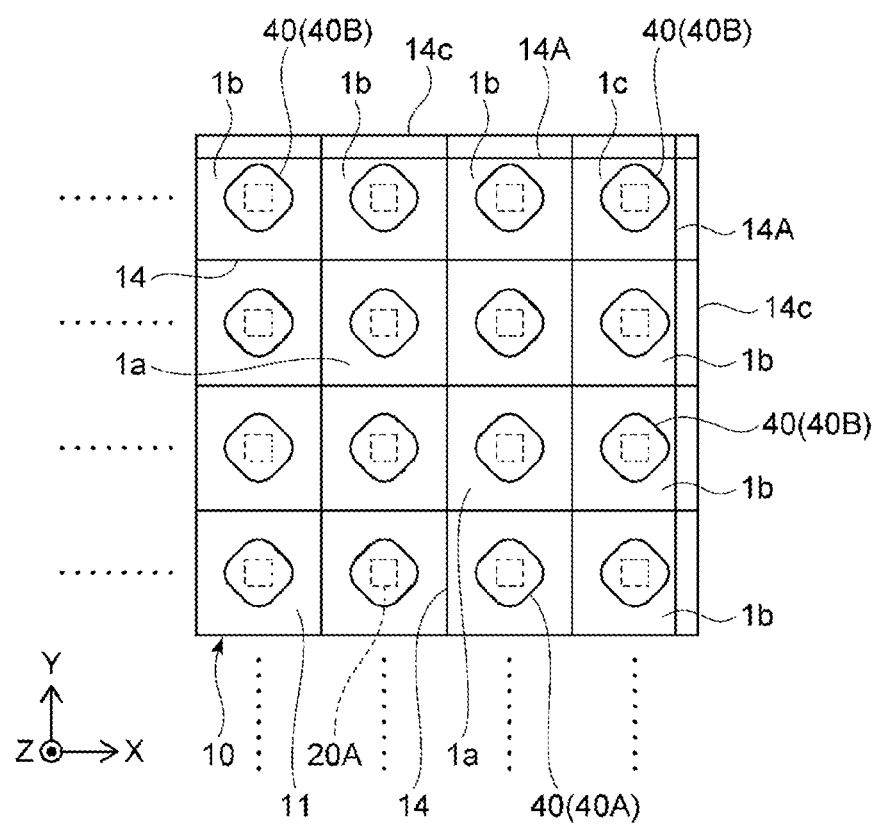
FIG. 12 is a schematic top view of a part of an exemplary planar light source of a seventh embodiment.

FIG. 12 is a schematic top view of a part of a planar light source according to the seventh embodiment (portion including the upper right corner of the planar light source illustrated in FIG. 1).

According to the seventh embodiment, a groove 14A is further disposed in the outer portion 1b and/or the outer portion 1c in addition to the groove 14 that separates the light guide member 10 into the plurality of light-emitting units 1. The groove 14A is disposed between the light source 20A on the outer portion 1b and/or the outer portion 1c and the outer surface 14c of the outer portion 1b and/or the outer portion 1c in the plan view, and extends in the first direction X and the second direction Y. The shape, size, depth, and the like of the groove 14A can be the same as the groove 14. Further, the partition member 15 may also be disposed in the groove 14A.

Light traveling from the light source 20A toward the groove 14A in the light guide member 10 tends to change its direction upward due to refraction or reflection at an interface between the light guide member 10 and the groove 14A. Therefore, light is easily extracted upward from the groove 14A disposed on the outer portion 1b and/or the outer portion 1c, and the groove 14A becomes a bright line. The bright line is disposed in a region of the outer portion 1b and/or the outer portion 1c on the outer surface 14c side, so that it is possible to compensate for a decrease in luminance on the outer surface 14c side where there are no adjacent light-emitting units 1. As a result, the brightness of one outer portion 1b can be made higher than the brightness of one inner portion 1a and the brightness of one outer portion 1c can be made higher than the brightness of one inner portion 1a in the individual light-emitting state.

Because light directed from the light source 20A toward the outer surface 14c is easily extracted upward from the groove 14A, the light does not easily reach a region between the groove 14A and the outer surface 14c. Therefore, the substantial light-emitting area of the outer portion 1b and the substantial light-emitting area of the outer portion 1c can be made smaller than the light-emitting area of the inner portion 1a, and the light emission intensity per unit area of the outer portion 1b and the light emission intensity per unit area of the outer portion 1c can be made higher than the light emission intensity per unit area of the inner portion 1a. Thus, the brightness of one outer portion 1b can be made higher than the brightness of one inner portion 1a and the brightness of one outer portion 1c can be made higher than the brightness of one inner portion 1a in the individual light-emitting state.

Figure 13:
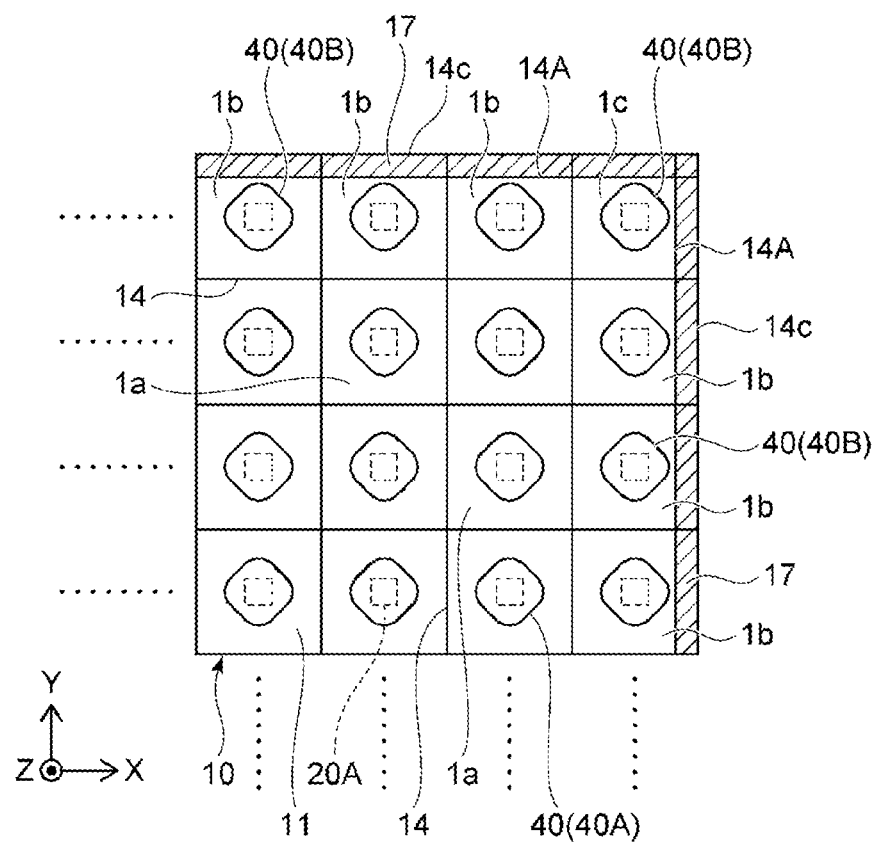
FIG. 13 is a schematic top view of a part of the exemplary planar light source of the seventh embodiment.

As illustrated in FIG. 13, in the plan view, a fourth light-reflective member 17 (represented by hatching in FIG. 13) can be disposed on an upper surface (the first surface 11 of the light guide member 10) between the groove 14A disposed in the outer portion 1b and/or the outer portion 1c and the outer surface 14c.

The planar light source can be used as a backlight of a liquid crystal display device, for example. In this case, a light-emitting surface of the planar light source (first surface of the light guide member 10) is disposed to face the liquid crystal panel, and an optical sheet such as a light diffusion sheet or a prism sheet may be disposed between the light-emitting surface of the planar light source and the liquid crystal panel. The fourth light-reflective member 17 reflects return light from the optical sheet to the planar light source side toward the optical sheet side. As described above, the region between the groove 14A and the outer surface 14c in the light guide member 10 is less likely to serve as a substantially light-emitting region. Consequently, disposing the fourth light-reflective member 17 on the region between the groove 14A and the outer surface 14c can suppress return light from the optical sheet from being incident on the region between the groove 14A and the outer surface 14c in the light guide member 10 and becoming loss light.

The fourth light-reflective member 17 is, for example, a resin member containing light scattering particles. As the fourth light-reflective member 17, for example, a member made of the same material as the first light-reflective member 40 can be used. For example, the thickness of the fourth light-reflective member 17 can be set in a range from 50 μm to 100 μm, and the concentration of, for example, titanium oxide as the light scattering particles in the fourth light-reflective member 17 can be set in a range from 20% by weight to 30% by weight.

Eighth Embodiment

Figure 14:
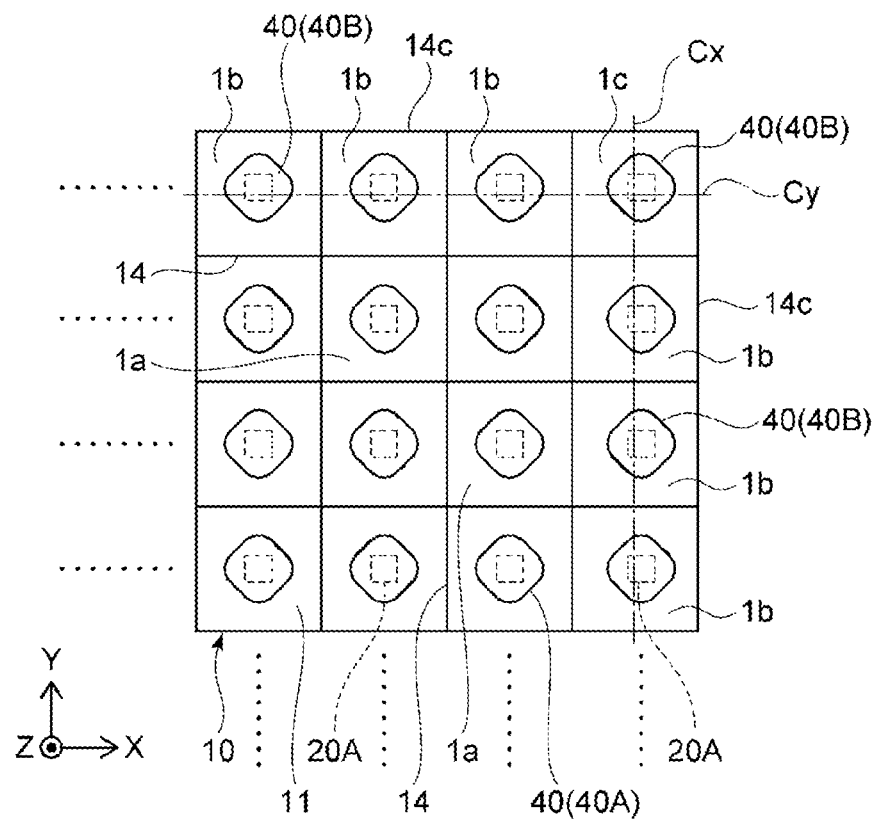
FIG. 14 is a schematic top view of a part of an exemplary planar light source of an eighth embodiment.

FIG. 14 is a schematic top view of a part of a planar light source according to the eighth embodiment (portion including the upper right corner of the planar light source illustrated in FIG. 1).

According to the eighth embodiment, the position of the light source 20A disposed on the outer portion 1b is shifted from the center of the outer portion 1b to the outer surface 14c side in the plan view, and the position of the light source 20A disposed on the outer portion 1c is shifted from the center of the outer portion 1c to the outer surface 14c side in the plan view. In the present embodiment, the center of the light source 20A disposed on the outer portion 1b in the plan view is shifted from the center of the outer portion 1b to the outer surface 14c side by 10 μm or more in the plan view, and the center of the light source 20A disposed on the outer portion 1c in the plan view is shifted from the center of the outer portion 1c to the outer surface 14c side by 10 μm or more in the plan view. The center of the light source 20A disposed on the outer portion 1b in the plan view is preferably shifted from the center of the outer portion 1b to the outer surface 14c side by 20 μm or more in the plan view, and the center of the light source 20A disposed on the outer portion 1c in the plan view is preferably shifted from the center of the outer portion 1c to the outer surface 14c side by 20 μm or more in the plan view. In the plan view, the shapes of the outer portion 1b and the outer portion 1c are quadrangles, and the center of the outer portion 1b and the center of the outer portion 1c are each located at an intersection of two diagonal lines of each of the quadrangles. In the plan view, the shape of the light source 20A is a quadrangle, and the center of the light source 20A is located at an intersection of two diagonal lines of the quadrangle. In FIG. 14, a center line Cx that virtually divides the outer portion 1b and the outer portion 1c into two equal parts in the first direction X and a center line Cy that virtually divides the outer portion 1b and the outer portion 1c into two equal parts in the second direction Y are represented by one-dot chain lines, respectively.

In the plan view, the centers of the respective light sources 20A disposed on the plurality of outer portions 1b arranged in the first direction X are located closer to the outer surface 14c side than the center line Cy in the second direction Y. The distance in the second direction Y between the center of the light sources 20A on the outer portion 1b and the center of the light sources 20A on the inner portion 1a adjacent in the second direction Y is longer than the distance in the second direction Y between the centers of the light sources 20A on the inner portions 1a adjacent in the second direction Y.

In the plan view, the centers of the respective light sources 20A disposed on the plurality of outer portions 1b arranged in the second direction Y are located closer to the outer surface 14c side than the center line Cx in the first direction X. The distance in the first direction X between the center of the light sources 20A on the outer portion 1b and the center of the light sources 20A on the inner portion 1a adjacent in first direction X is longer than the distance in the first direction X between the centers of the light sources 20A on the inner portions 1a adjacent in the first direction X.

In the plan view, the center of the light source 20A disposed on the outer portion 1c at a corner is located closer to the outer surface 14c side than the center line Cy in the second direction Y, and is located closer to the outer surface 14c side than the center line Cx in the first direction X. That is, the center of the light source 20A disposed on the outer portion 1c at the corner is shifted from the center of the outer portion 1c to become closer to the corner of the light guide member 10.

According to the eighth embodiment, the position of the light source 20A on each of the outer portion 1b and the outer portion 1c is shifted to the outer surface 14c side, so that it is possible to compensate for a decrease in luminance on the outer surface 14c side where adjacent light-emitting units 1 are not disposed. Moreover, while compensating for a decrease in luminance on the outer surface 14c side by combining the eighth embodiment with at least one of the other embodiments, the brightness of one outer portion 1b can be made higher than the brightness of one inner portion 1a and the brightness of one outer portion 1c can be made higher than the brightness of one inner portion 1a in the individual light-emitting state.

The number of adjacent light-emitting units 1 on the outer portion 1c at the corner is smaller than the outer portion 1b not located at the corner. Therefore, only the light source 20A disposed on the outer portion 1c at the corner is shifted to the outer surface 14c side from the center line Cy in the second direction Y and is shifted to the outer surface 14c side from the center line Cx in the first direction X, so that it also contribute to reduce luminance unevenness on the light-emitting surface of the planar light source in the entire light-emitting state.

In the plan view, the center of the outer light-reflective member 40B is located in the center of the light source 20A on the outer portion 1c. In the plan view, the center of the first hole portion h1 on the outer portion 1c is located in the center of the light source 20A on the outer portion 1c. Alternatively, in the plan view, the center of the first hole portion h1 may be located in the center of the outer portion 1c, and the center of the light source 20A may be shifted from the center of the first hole portion h1 to the outer surface 14c side.

Ninth Embodiment

Figure 15:
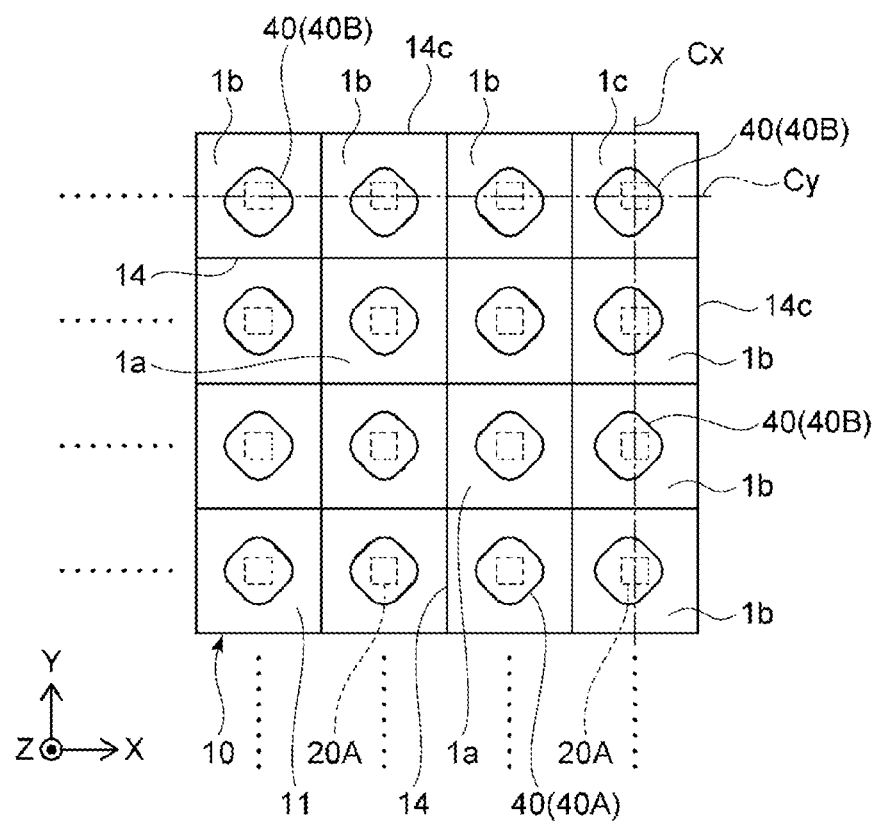
FIG. 15 is a schematic top view of a part of an exemplary planar light source of a ninth embodiment.

FIG. 15 is a schematic top view of a part of a planar light source according to the ninth embodiment (portion including the upper right corner of the planar light source illustrated in FIG. 1).

According to the ninth embodiment, the position of the outer light-reflective member 40B disposed on each of the outer portion 1b and the outer portion 1c is shifted from the center of each of the outer portion 1b and the outer portion 1c to the inner portion 1a side in the plan view.

In the plan view, the center of each of the outer light-reflective member 40B disposed on the plurality of outer portions 1b arranged in the first direction X is located closer to the inner portion 1a side than the center line Cy in the second direction Y. The distance in the second direction Y between the center of the outer light-reflective member 40B on the outer portions 1b and the center of the inner light-reflective member 40A on the inner portion 1a adjacent in the second direction Y is shorter than the distance in the second direction Y between the centers of the inner light-reflective members 40A on the inner portions 1a adjacent in the second direction Y. When the shape of the first light-reflective member 40 in the plan view is a quadrangle, the center of the first light-reflective member 40 including the inner light-reflective member 40A and the outer light-reflective member 40B is located on an intersection of diagonal lines of the quadrangle, and when the shape of the first light-reflective member 40 in the plan view is a circle, the center of the first light-reflective member 40 is located in the center of the circle. Further, when the shape of the first light-reflective member 40 in the plan view is a quadrangle with rounded corners, an intersection of the diagonal lines of the quadrangles defined by an intersection of extension lines of each side is referred to as the center of the first light-reflective member 40.

In the plan view, the center of the outer light-reflective member 40B disposed on each of the plurality of outer portions 1b arranged in the second direction Y is located closer to the inner portion 1a side than the center line Cx in the first direction X. The distance in the first direction X between the center of the outer light-reflective member 40B on the outer portions 1b and the center of the inner light-reflective member 40A on the inner portion 1a adjacent in the first direction X is shorter than the distance in the first direction X between the centers of the inner light-reflective members 40A on the inner portions 1a adjacent in the first direction X.

In the plan view, the center of the outer light-reflective member 40B disposed on the outer portion 1c at the corner is located closer to the inner portion 1a side than the center line Cy in the second direction Y, and is located closer to the inner portion 1a side than the center line Cx in the first direction X.

According to the ninth embodiment, the position of the outer light-reflective member 40B on the outer portion 1b and the outer portion 1c is shifted to the inner portion 1a side, so that the amount of light extracted from the light source 20A above the region on the outer surface 14c side can be increased. Thus, the brightness of one outer portion 1b can be made higher than the brightness of one inner portion 1a and the brightness of one outer portion 1c can be made higher than the brightness of one inner portion 1a in the individual light-emitting state while compensating for a decrease in luminance on the outer surface 14c side where adjacent light-emitting units 1 are not disposed.

In the ninth embodiment, in the plan view, the center of the light source 20A on the outer portion 1b and the outer portion 1c is located in the center of the outer portion 1b and the outer portion 1c. Alternatively, by combining the ninth embodiment with the eighth embodiment, the position of the outer light-reflective member 40B on the outer portion 1b and the outer portion 1c may be shifted to the inner portion 1a side, and the position of the light source 20A on the outer portion 1b and the outer portion 1c may be shifted to the outer surface 14c side. Further, in the ninth embodiment, only the outer light-reflective member 40B disposed on the outer portion 1c at the corner may be shifted to the inner portion 1a side from the center line Cy in the second direction Y, and may be shifted to the inner portion 1a side from the center line Cx in the first direction X.

Tenth Embodiment

Figure 16:
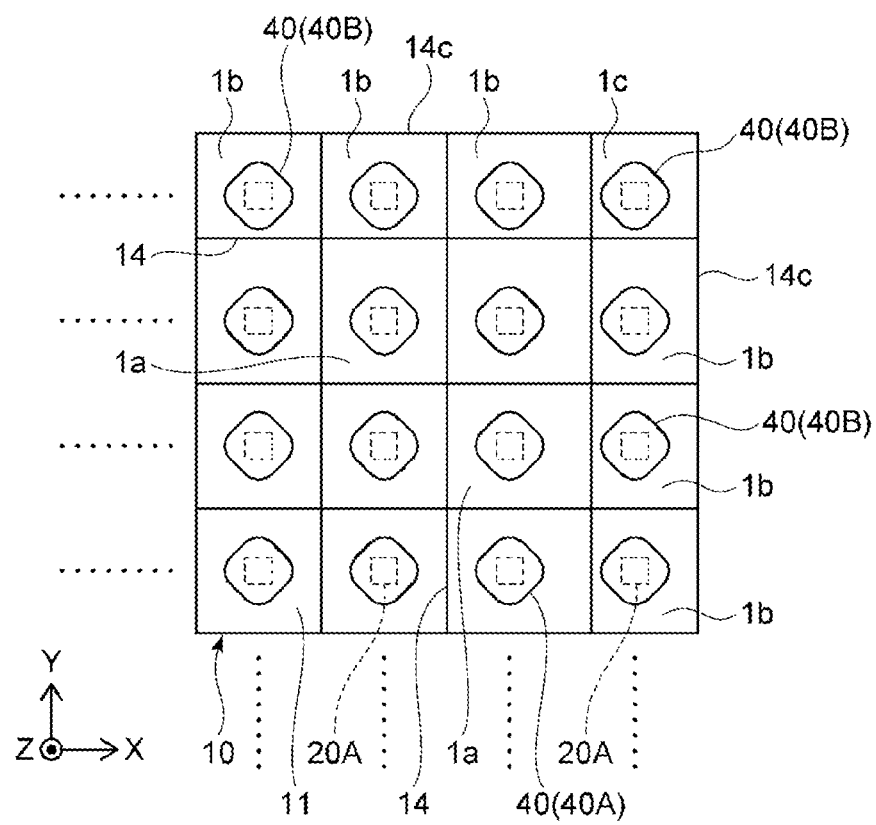
FIG. 16 is a schematic top view of a part of an exemplary planar light source of a tenth embodiment.

FIG. 16 is a schematic top view of a part of a planar light source according to the tenth embodiment (portion including the upper right corner of the planar light source illustrated in FIG. 1).

According to the tenth embodiment, the size of an area of the outer portion 1b and the size of an area of the outer portion 1c in the plan view are made smaller than the size of an area of the inner portion 1a. For example, as illustrated in FIG. 16, the groove 14 that separates the outer portion 1b and the inner portion 1a adjacent to this outer portion 1b, and the groove 14 that separates the outer portion 1c and the inner portion 1a adjacent to this outer portion 1c, are shifted to the light source 20A side disposed on this outer portion 1b and the light source 20A side disposed on this outer portion 1c with respect to the light source 20A disposed on the inner portion 1a adjacent to this outer portion 1b and the light source 20A disposed on the inner portion 1a adjacent to this outer portion 1c in the plan view, so that the size of the area of the outer portion 1b and the size of the area of the outer portion 1c in the plan view can be made smaller than the size of the area of the inner portion 1a.

In the plan view, the length in the second direction Y of the plurality of outer portions 1b arranged in the first direction X is shorter than the length in the second direction Y of the inner portion 1a. In the plan view, the length in the first direction X of the plurality of outer portions 1b arranged in the second direction Y is shorter than the length in the first direction X of the inner portion 1a. The length in the first direction X of the outer portion 1c at the corner is shorter than the length in the first direction X of the inner portion 1a, and the length in the second direction Y of the outer portion 1c at the corner is shorter than the length in the second direction Y of the inner portion 1a.

According to the tenth embodiment, the light-emitting area of the outer portion 1b and the light-emitting area of the outer portion 1c defined by the groove 14 and the outer surface 14c can be made smaller than the light-emitting area of the inner portion 1a defined by the groove 14, and the light emission intensity per unit area of the outer portion 1b and the light emission intensity per unit area of the outer portion 1c can be made higher than the light emission intensity per unit area of the inner portion 1a. Thus, the brightness of one outer portion 1b can be made higher than the brightness of one inner portion 1a and the brightness of one outer portion 1c can be made higher than the brightness of one inner portion 1a in the individual light-emitting state. Note that in FIG. 16, the inner portion 1a adjacent to the outer portion 1b in the first direction X and the inner portion 1a adjacent to the outer portion 1b in the second direction Y have a larger light-emitting area than the inner portion 1a not adjacent to either the outer portion 1b or the outer portion 1c, but all the inner portions 1a may have the same light-emitting area. For example, by shifting the region of the outer surface 14c to the light source 20 side disposed on the outer portion 1b and the light source 20A side disposed on the outer portion 1c, the light-emitting area of the outer portion 1b and the light-emitting area of the outer portion 1c can be made smaller than the light-emitting areas of all the inner portions 1a while allowing all the inner portions 1a to have the same light-emitting area.

By combining the tenth embodiment with the eighth embodiment, the position of the light source 20A on the outer portion 1b and the position of the light source 20A on the outer portion 1c may be shifted to the outer surface 14c side while reducing the light-emitting area of the outer portion 1b and the light-emitting area of the outer portion 1c. Further, by combining the tenth embodiment with the ninth embodiment, the position of the outer light-reflective member 40B on the outer portion 1b and the position of the outer light-reflective member 40B on the outer portion 1c may be shifted to the inner portion 1a side while reducing the light-emitting area of the outer portion 1b and the light-emitting area of the outer portion 1c. Moreover, the tenth embodiment may be combined with both the eighth embodiment and the ninth embodiment. Further, in the tenth embodiment, the distance between the light sources 20A respectively disposed in the light-emitting units 1 may be made constant while reducing the light-emitting area of the outer portion 1b and the light-emitting area of the outer portion 1c.

Eleventh Embodiment

Figure 17:
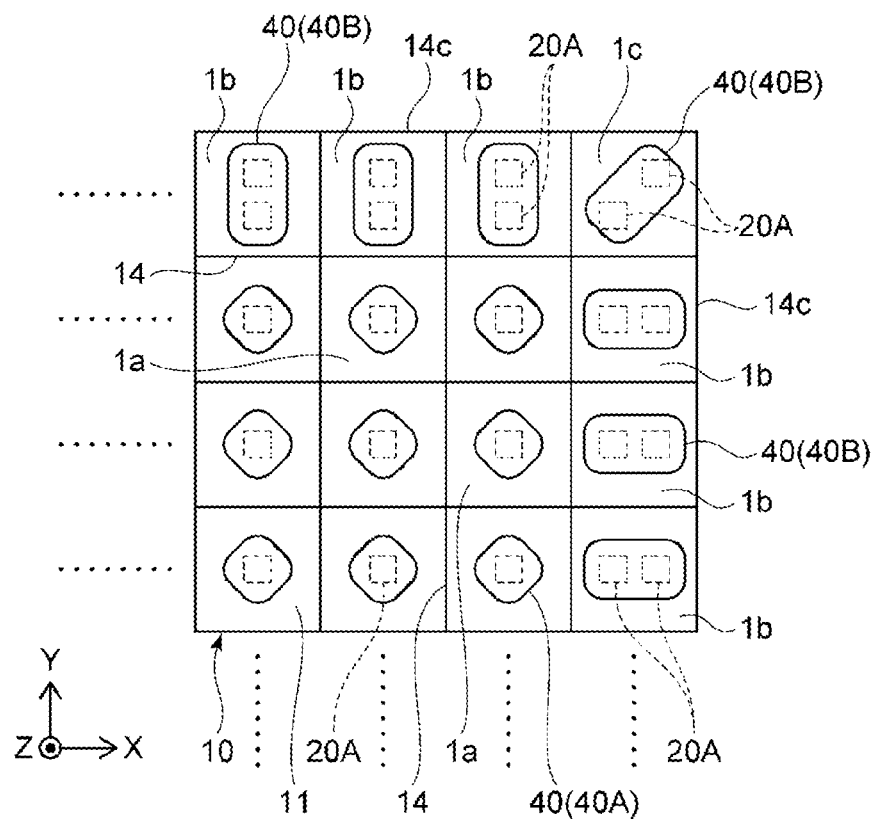
FIG. 17 is a schematic top view of a part of an exemplary planar light source of an eleventh embodiment.

FIG. 17 is a schematic top view of a part of a planar light source according to the eleventh embodiment (portion including the upper right corner of the planar light source illustrated in FIG. 1).

According to the eleventh embodiment, the number of light sources 20A disposed on one outer portion 1b and the number of light sources 20A disposed on one outer portion 1c are greater than the number of light sources 20A disposed on one inner portion 1a. For example, two light sources 20A can be disposed on one outer portion 1b, two light sources 20A can be disposed on one outer portion 1c, and one light source 20A can be disposed on one inner portion 1a. Thus, the brightness of one outer portion 1b can be made higher than the brightness of one inner portion 1a and the brightness of one outer portion 1c can be made higher than the brightness of one inner portion 1a in the individual light-emitting state.

The outer light-reflective member 40B on one outer portion 1b overlaps a plurality of light sources 20A on one outer portion 1b in the plan view, and the outer light-reflective member 40B on one outer portion 1c overlaps a plurality of light sources 20A on one outer portion 1c in the plan view.

Twelfth Embodiment

Figure 18:
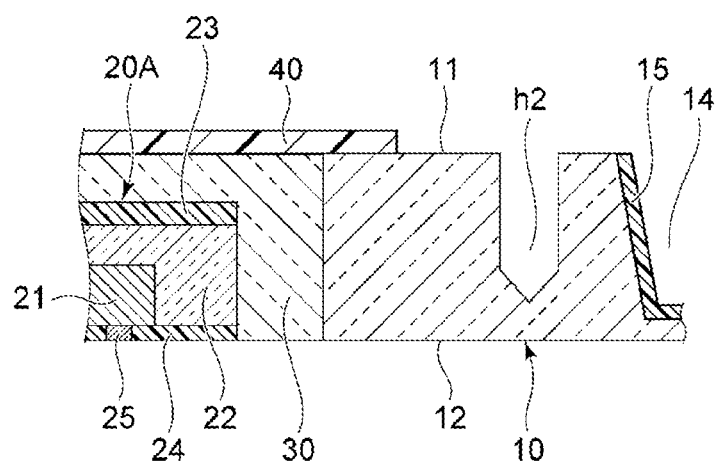
FIG. 18 is a schematic cross-sectional view of a part of an exemplary planar light source of a twelfth embodiment.

FIG. 18 is a schematic cross-sectional view of a part of a planar light source according to the twelfth embodiment.

The light guide member 10 further includes a second hole portion h2. The second hole portion h2 is located between the light source 20A and the groove 14. The second hole portion h2 opens to the first surface 11 side. The bottom surface of the light guide member 10 defining the second hole portion h2 includes, for example, the light guide member 10, and is preferably located below the upper surface of the light source 20A in the cross-sectional view. Further the depth of the second hole portion h2 can be preferably 100 µm or more, more preferably 200 µm or less. The second hole portion h2 may penetrate between the first surface 11 and the second surface 12. The second hole portion h2 may open to the second surface 12 side. The second hole portion h2 may be hollow and not have an opening portion in either of the first surface 11 side or the second surface 12 side.

Light traveling from the light source 20A toward the groove 14 in the light guide member 10 tends to change its direction above the second hole portion h2 due to refraction or reflection of light at an interface between the light guide member 10 and the second hole portion h2. Therefore, light can be easily extracted above the second hole portion h2, so that an upper part in a region directly above the second hole portion h2 and a region around the second hole portion h2 can be lightened.

According to the twelfth embodiment, the number of second hole portions h2 disposed in one outer portion 1b is greater than the number of second hole portions h2 disposed in one inner portion 1a. The number of second hole portions h2 disposed in one outer portion 1c is greater than the number of second hole portions h2 disposed in one inner portion 1a. The second hole portion h2 may not be disposed in the inner portion 1a. Alternatively, in the plan view, an area of the second hole portion h2 disposed in the one outer portion 1b may be greater than an area of the second hole portion h2 disposed in the one inner portion 1a. An area of the second hole portion h2 disposed in one outer portion 1c may be greater than the area of the second hole portion h2 disposed in one inner portion 1a. When a plurality of second hole portions h2 are disposed in each of one outer portion 1b, one outer portion 1c, and one inner portion 1a, the area of the second hole portion h2 indicates the total value of the areas of the plurality of second hole portions h2. Thus, according to the twelfth embodiment, the brightness of one outer portion 1b can be made higher than the brightness of one inner portion 1a and the brightness of one outer portion 1c can be made higher than the brightness of one inner portion 1a in the individual light-emitting state.

Hereinafter, arrangement examples of the second hole portion h2 are described with reference to schematic top views of FIGS. 19 to 23B. In FIGS. 19 to 23B, the outer portion 1b, the outer portion 1c, and the inner portion 1a are not distinguished and are referred to as the light-emitting unit 1. The second hole portion h2 illustrated in FIGS. 19 to 23B can be applied to any of the outer portion 1b, the outer portion 1c, and the inner portion 1a.

Figure 19:
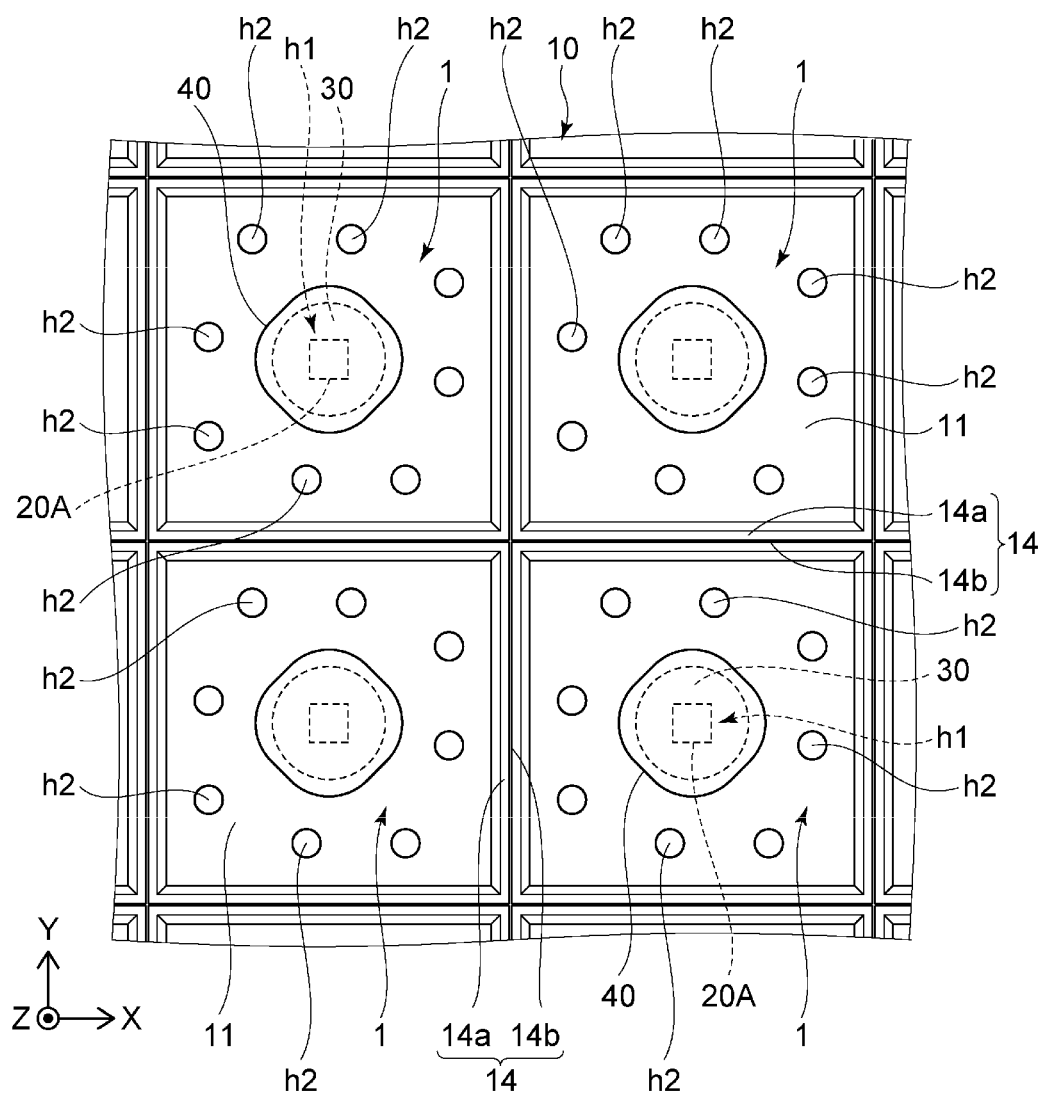
FIG. 19 is a schematic top view illustrating an arrangement example of second hole portions in the twelfth embodiment.
Figure 20:
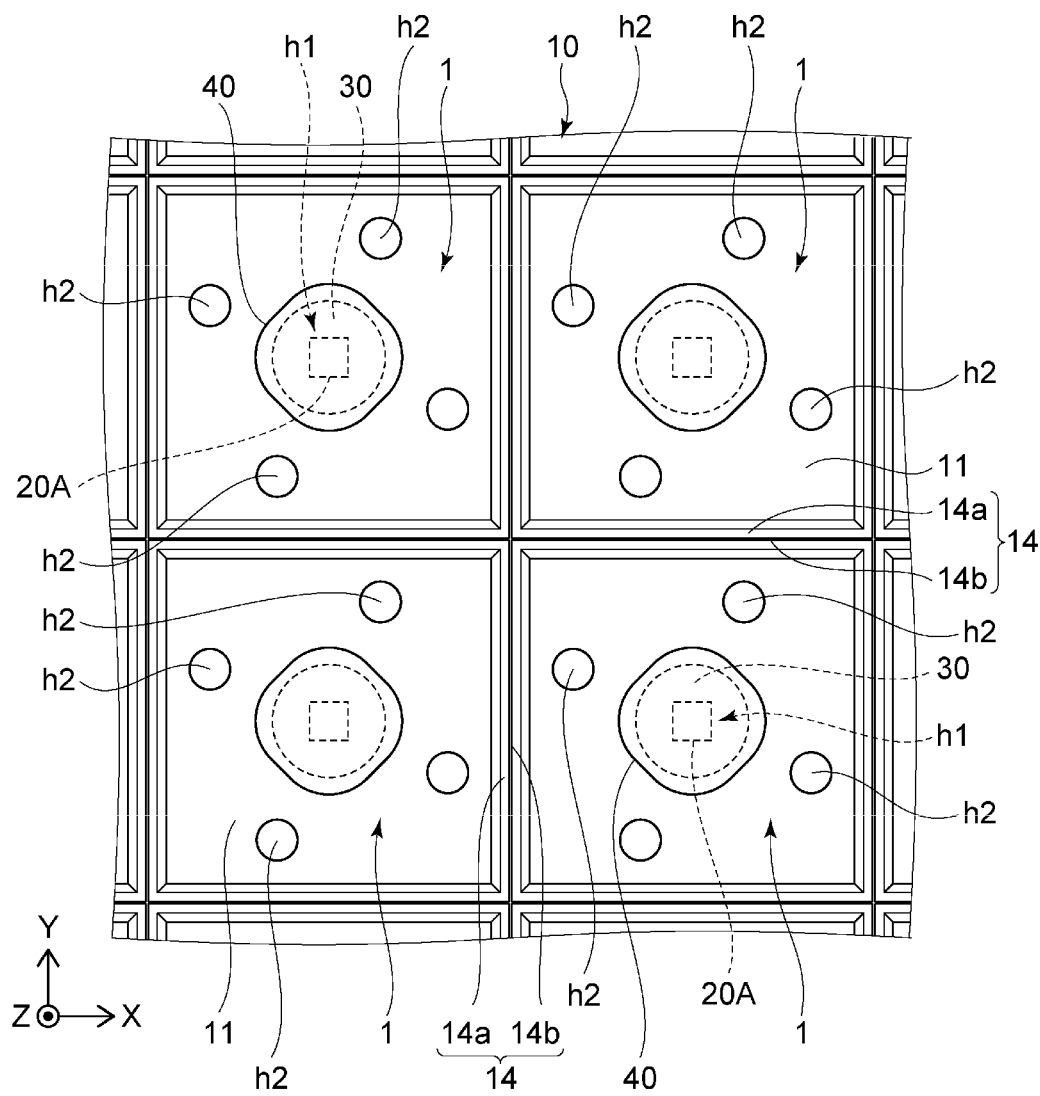
FIG. 20 is a schematic top view illustrating an arrangement example of second hole portions in the twelfth embodiment.
Figure 21:
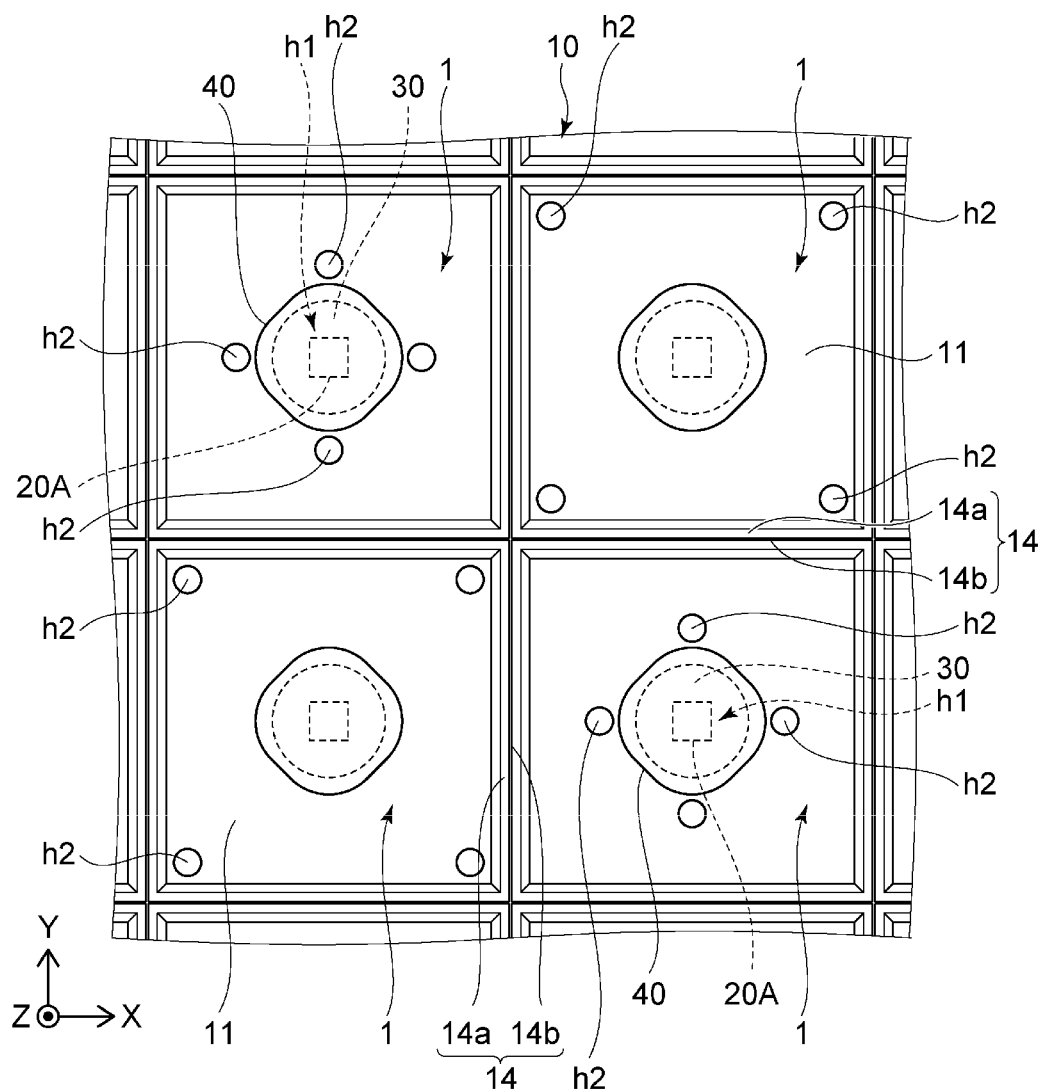
FIG. 21 is a schematic top view illustrating an arrangement example of second hole portions in the twelfth embodiment.

As illustrated in FIGS. 19 to 21, in the plan view, the second hole portion h2 can be, for example, circular. Further, the shape of the second hole portion h2 can be, for example, an ellipse, or a polygon such as a triangle, a quadrangle, a hexagon, or an octagon in the plan view. Further, the shape of the second hole portion h2 can be, for example, a linear shape in the plan view. When the second hole portion h2 is linear shape in the plan view, the second hole portion h2 can be a groove extending along the groove 14 and the outer surface 14c.

In the plan view, the second hole portion h2 disposed in one light-emitting unit 1, of adjacent light-emitting units 1 having the groove 14 interposed therebetween, is referred to as one second hole portion h2, and the second hole portion h2 disposed in the other light-emitting unit 1, of the adjacent light-emitting units 1 having the groove 14 interposed therebetween, is referred to as the other second hole portion h2.

As described above, light can be easily extracted upward in the second hole portion h2. Therefore, in a position where the second hole portion h2 is in the intermediate portion of an optical path from the light source 20A toward the groove 14, the light is less likely to reach a region ahead of the second hole portion h2. That is, in the groove 14 and a region in the vicinity of the groove 14, a region facing the second hole portion h2 tends to be dark in the plan view.

According to the examples illustrated in FIGS. 19 to 21, positions in the second direction Y of the one second hole portion h2 and the other second hole portion h2 that are adjacent to each other with the groove 14 interposed therebetween without interposing the light source 20A therebetween in the first direction X are shifted from each other. In other words, in two adjacent light-emitting units 1 having the groove 14 interposed therebetween in the first direction X, positions in the second direction Y of the second hole portion 2h closest to the groove 14 of the one light-emitting unit 1 and the second hole portion 2h closest to the groove 14 of the other light-emitting unit 1 are shifted from each other. In the plan view, the other second hole portion h2 is not located on a straight line passing through the center of the one second hole portion h2 and parallel to the first direction X. In the plan view, the one second hole portion h2 is not located on a straight line passing through the center of the other second hole portion h2 and parallel to the first direction X.

Further, positions in the first direction X of the one second hole portion h2 and the other second hole portion h2 that are adjacent to each other with the groove 14 interposed therebetween without interposing the light source 20A therebetween in the second direction Y are shifted from each other. In other words, in two adjacent light-emitting units 1 having the groove 14 interposed therebetween in the second direction Y, positions in the first direction X of the second hole portion 2h closest to the groove 14 of the one light-emitting unit 1 and the second hole portion 2h closest to the groove 14 of the other light-emitting unit 1 are shifted from each other. In the plan view, the other second hole portion h2 is not located on a straight line passing through the center of the one second hole portion h2 and parallel to the second direction Y. In the plan view, the one second hole portion h2 is not located on a straight line passing through the center of the other second hole portion h2 and parallel to the second direction Y.

Thus, it is possible to suppress a region ahead of the second hole portion h2 on the optical path from the light source 20A toward the groove 14 from becoming dark. As a result, luminance unevenness on the light-emitting surface of the planar light source can be reduced.

In the example illustrated in FIG. 19, two second hole portions h2 are disposed in the region between the light source 20A and the groove 14 in each of the light-emitting units 1 in the direction along the groove 14. Note that three or more second hole portions h2 may be disposed in the region between the light source 20A and the groove 14 in each of the light-emitting units 1 in the direction along the groove 14. Further, as illustrated in FIG. 20, one second hole portion h2 may be disposed in the region between the light source 20A and the groove 14 in each of the light-emitting units 1. Further, a plurality of second hole portions h2 may be disposed in the region between the light source 20A and the groove 14 in each of the light-emitting units 1 along a direction orthogonal to or oblique with respect to the direction in which the groove 14 extends.

Further, as illustrated in FIG. 21, in the plan view, in one light-emitting unit 1, the second hole portion h2 can be disposed in the vicinity of each of four corners, and in the other light-emitting unit 1 adjacent to the one light-emitting unit 1, the second hole portion h2 can be disposed at a position where the light-emitting unit 1 is equally divided into two in the first direction X and a position where the light-emitting unit 1 is equally divided into two in the second direction Y.

Next, second hole portions h2 illustrated in FIGS. 22A to 23B are described. In FIGS. 22A to 23B, for convenience of description, a virtual first straight line L1 and a second straight line L2 are set in the light-emitting unit 1. The first straight line L1 is a straight line connecting the center of the light source 20A and a position farthest from the center of the light source 20A in the groove 14 in a plan view of the light-emitting unit 1. The second straight line L2 is a straight line connecting the center of the light source 20A and a position closest to the center of the light source 20A in the groove 14 in the plan view of the light-emitting unit 1. The shape of the light-emitting unit 1 in the plan view is a quadrangle, and the center of the light source 20A matches the center of the light-emitting unit 1. In this case, the position farthest from the center of the light source 20A in the groove 14 is the corner of the light-emitting unit 1. The position closest to the center of the light source 20A in the groove 14 is a position whether the groove 14 is equally divided into two in each of the first direction X and the second direction Y. There are four first straight lines L1 and four second straight lines L2.

Figure 22A:
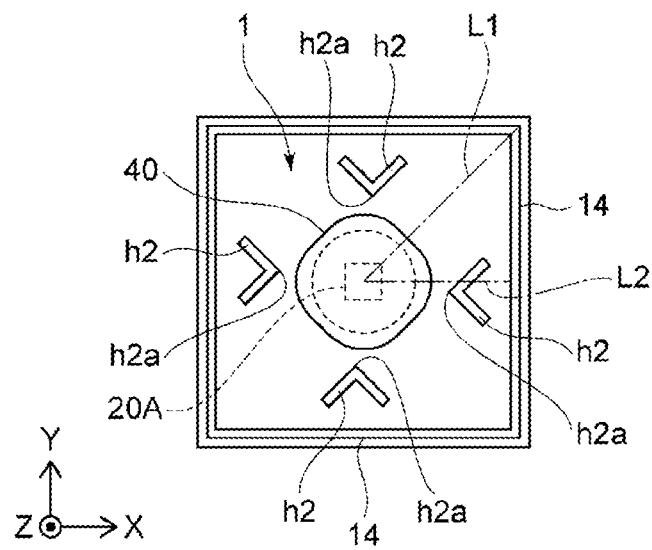
FIG. 22A is a schematic top view illustrating an arrangement example of second hole portions in the twelfth embodiment.

In the example illustrated in FIG. 22A, the second hole portions h2 are disposed at positions intersecting the second straight line L2, and are not disposed on the first straight line L1. The second hole portion h2 in the plan view has a V shape. The second hole portion h2 is disposed so that the V-shaped vertex (bent portion) h2a faces one side of the light source 20A. With such a second hole portion h2, light emitted from one side of the light source 20A is reflected and refracted by two lateral surfaces forming the V shape of the second hole portion h2 and tends to travel toward the corner of the light-emitting unit 1. Thus, it is possible to compensate for a decrease in luminance at a corner located at the farthest position from the center of the light source 20A and to reduce uneven luminance on the light-emitting surface of the planar light source.

Further, the position of the center (V-shaped vertex h2a) in the second direction Y of each of two second hole portions h2 with the light source 20A interposed therebetween in the first direction X is not located on the same straight line in the first direction X. The position of the center (V-shaped vertex h2a) in the first direction X of each of two second hole portions h2 with the light source 20A interposed therebetween in the second direction Y is not located on the same straight line in the second direction Y. Therefore, in a planar light source in which a plurality of the light-emitting units 1 illustrated in FIG. 22A are disposed in the first direction X and the second direction Y, it is possible to suppress a region ahead of the second hole portion h2 on the optical path from the light source 20A toward the groove 14 from becoming dark. As a result, luminance unevenness on the light-emitting surface of the planar light source can be reduced.

Figure 22B:
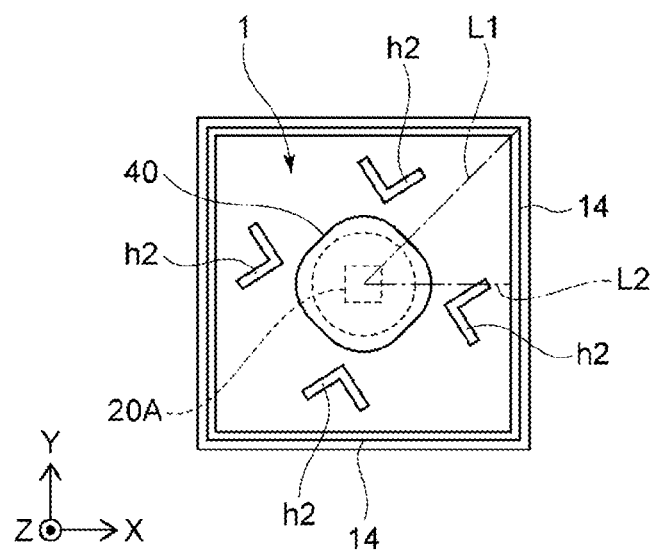
FIG. 22B is a schematic top view illustrating an arrangement example of second hole portions in the twelfth embodiment.

FIG. 22B illustrates an arrangement example in which four second hole portions h2 disposed in one light-emitting unit 1 illustrated in FIG. 22A are rotationally shifted around the center of the light-emitting unit 1. Also in the example illustrated in FIG. 22B, light emitted from one side of the light source 20A is reflected and refracted by two lateral surfaces forming the V shape of the second hole portion h2 and tends to travel toward the corner of the light-emitting unit 1. Moreover, the position of the center (V-shaped vertex h2a) in the second direction Y of each of two second hole portions h2 with the light source 20A interposed therebetween in the first direction X is not located on the same straight line in the first direction X. The position of the center (V-shaped vertex h2a) in the first direction X of each of two second hole portions h2 with the light source 20A interposed therebetween in the second direction Y is not located on the same straight line in the second direction Y. Thus, in a planar light source in which a plurality of the light-emitting units 1 illustrated in FIG. 22B are disposed in the first direction X and the second direction Y, it is possible to suppress a region ahead of the second hole portion h2 on the optical path from the light source 20A toward the groove 14 from becoming dark, and to reduce luminance unevenness on the light-emitting surface of the planar light source.

In the example of FIG. 22B, as compared with the example of FIG. 22A, it is possible to reduce a portion where two second hole portions h2 with the groove 14 interposed therebetween in the first direction X overlap in the second direction Y and a portion where two second hole portions h2 with the groove 14 interposed therebetween in the second direction Y overlap in the first direction X. Thus, in the example illustrated in FIG. 22B, it is possible to further suppress a region ahead of the second hole portion h2 on the optical path from the light source 20A toward the groove 14 from becoming dark.

Figure 23A:
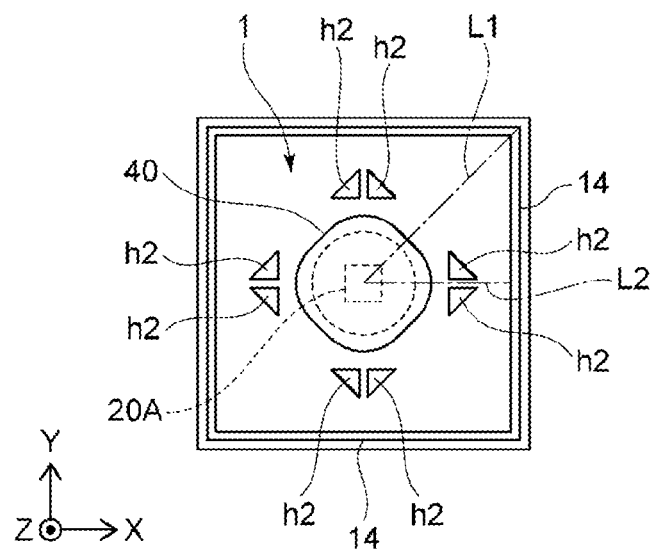
FIG. 23A is a schematic top view illustrating an arrangement example of second hole portions in the twelfth embodiment.

In the example illustrated in FIG. 23A, in the plan view, second hole portions h2 each having a triangular shape are disposed in a region between the light source 20A and the groove 14. In the example illustrated in FIG. 23A in which the second hole portion h2 is not disposed on the first straight line L1, in a region between each of four grooves 14 surrounding one light-emitting unit 1 and the light source 20A, two second hole portions h2 are disposed close to each other so as to interpose the second straight line L2 in the first direction X or the second direction Y.

In the two second hole portions h2 close to each other with the second straight line L2 interposed therebetween, a lateral surface (inner surface) on the side of the second hole portion h2 facing the light source 20A is parallel to one side of the light source 20A. In these two second hole portions h2, a lateral surface (outer surface) on the side of the second hole portion h2 facing the groove 14 is inclined with respect to the direction in which the groove 14 extends. Light from the light source 20A passes through the inner surface of the second hole portion h2, enters into the second hole portion h2, is refracted by the outer surface of the second hole portion h2, and then tends to travel toward the corner direction. Thus, it is possible to compensate for a decrease in luminance at the corners and reduce uneven luminance on the light-emitting surface of the planar light source.

Also in the example illustrated in FIG. 23A, as in the example illustrated in FIG. 19 described above, positions in the first direction X and the second direction Y of one second hole portion h2 and the other second hole portion h2 that are adjacent to each other with the groove 14 interposed therebetween can be shifted from each other.

Figure 23B:
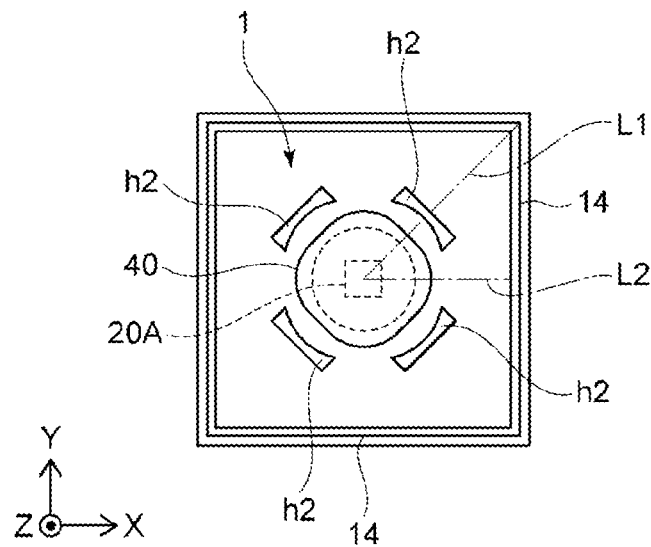
FIG. 23B is a schematic top view illustrating an arrangement example of second hole portions in the twelfth embodiment.

In the example illustrated in FIG. 23B, second hole portions h2 are disposed at positions intersecting the first straight line L1, and are not disposed on the second straight line L2. The shape of the second hole portion h2 in the plan view is a plano-concave lens shape. The recessed surface of the second hole portion h2 faces the light source 20A, and the flat surface faces the corner of the light-emitting unit 1. Light from the light source 20A is focused toward the corner by the second hole portion h2 having a concave lens shape. Thus, it is possible to compensate for a decrease in luminance at the corners and reduce uneven luminance on the light-emitting surface of the planar light source.

Also in the example illustrated in FIG. 23B, as in the example illustrated in FIG. 20 described above, positions in the first direction X and the second direction Y of one second hole portion h2 and the other second hole portion h2 that are adjacent to each other with the groove 14 interposed therebetween can be shifted from each other.

Thirteenth Embodiment

The arrangement examples of second hole portions h2 illustrated in FIGS. 19 to 23B can be applied without distinction among the inner portion 1a, the outer portion 1b, and the outer portion 1c. That is, the number of second hole portions h2 disposed on one outer portion 1b and the number of second hole portions h2 disposed on one outer portion 1c are not limited to being greater than the number of second hole portions h2 disposed on one inner portion 1a. Further, in the plan view, the area of the second hole portion h2 disposed on the one outer portion 1b and the area of the second hole portion h2 disposed on the one outer portion 1c are not limited to being greater than the area of the second hole portion h2 disposed on the one inner portion 1a. The number of second hole portions h2 disposed on one outer portion 1b may be the same as or less than the number of second hole portions h2 disposed on one inner portion 1a. The number of second hole portions h2 disposed on one outer portion 1c may be the same as or less than the number of second hole portions h2 disposed on one inner portion 1a. In the plan view, the area of the second hole portion h2 disposed on the one outer portion 1b may be the same as or smaller than the area of the second hole portion h2 disposed on the one inner portion 1a. In the plan view, the area of the second hole portion h2 disposed on one outer portion 1c may be the same as or smaller than the area of the second hole portion h2 disposed on one inner portion 1a.

Also in the thirteenth embodiment, similarly to the twelfth embodiment, positions in the first direction X and the second direction Y of one second hole portion h2 and the other second hole portion h2 that are adjacent to each other with the groove 14 interposed therebetween are shifted from each other, so that it is possible to suppress a region ahead of the second hole portion h2 on the optical path from the light source 20A toward the groove 14 from becoming dark, and to reduce luminance unevenness on the light-emitting surface of the planar light source.

The embodiments of the present invention have been described above with reference to specific examples. However, the present invention is not limited to these specific examples. All aspects that can be practiced by a person skilled in the art modifying the design as appropriate based on the above-described embodiments of the present invention are also included in the scope of the present invention, as long as they encompass the spirit of the present invention. In addition, in the spirit of the present invention, a person skilled in the art can conceive of various alteration examples and modification examples, and those alteration examples and modification examples will also fall within the scope of the present invention.

What is claimed is:

1. A planar light source, comprising:
a light guide member including a plurality of light-emitting units separated by a groove, the plurality of light-emitting units including a plurality of outer portions and at least one inner portion located in a region surrounded by the plurality of outer portions in a plan view,
   wherein in the plan view, at least one of the plurality of outer portions is adjacent to a smaller number of light-emitting units than a number of light-emitting units to which one of the at least one inner portion is adjacent, and
   wherein in a state in which a same power is supplied and one of the plurality of outer portion and one of the at least one inner portion are allowed to individually emit light, brightness of the one of the plurality of outer portions is higher than brightness of the one of the at least one inner portion;
one or more light sources disposed in one or more of the plurality of light-emitting units;
an outer light-reflective member that is disposed on the one of the plurality of outer portions and at a position overlapping the one or more light sources in the plan view and that partially reflects light from the one or more light sources; and
an inner light-reflective member that is disposed on the one of the at least one inner portion and at a position overlapping the one or more light sources in the plan view and that partially reflects the light from the one or more light sources,
wherein a covering ratio of the outer light-reflective member covering the one of the plurality of outer portions is smaller than a covering ratio of the inner light-reflective member covering the one of the at least one inner portion.

2. The planar light source according to claim 1, wherein the brightness of the one of the at least one inner portion is the brightness of the one of the at least one inner portion closest to a center of the light guide member in the plan view.

3. The planar light source according to claim 1, wherein the brightness of the one of the plurality of outer portions is set in a range of from 1.3 times to 3 times the brightness of the one of the at least one inner portion.

4. The planar light source according to claim 1, wherein light transmittance of the outer light-reflective member is higher than light transmittance of the inner light-reflective member.

5. The planar light source according to claim 1, wherein a thickness of the outer light-reflective member is thinner than a thickness of the inner light-reflective member.

6. The planar light source according to claim 1, wherein the outer light-reflective member include first light scattering particles and the inner light-reflective member include second light scattering particles, and
a concentration of the first light scattering particles in the outer light-reflective member is lower than a concentration of the second light scattering particles in the inner light-reflective member.

7. The planar light source according to claim 1, wherein the light guide member includes a first surface, a second surface on a side opposite to the first surface, and a first hole portion penetrating from the first surface to the second surface and disposed in one or more of the plurality of light-emitting units,
the one or more light sources are disposed in the first hole portion,
in the plan view, the inner light-reflective member covers an outer edge defining the first hole portion, and
in the plan view, the outer edge defining the first hole portion around the outer light-reflective member is exposed.

8. The planar light source according to claim 1, further comprising:
a light-transmissive member including a light diffusing material,
wherein the light guide member includes a first surface, a second surface on a side opposite to the first surface, and a first hole portion penetrating from the first surface to the second surface and disposed in each of the plurality of light-emitting units,
the one or more light sources are disposed in the first hole portion,
the light-transmissive member is disposed in the first hole portion to cover the one or more light sources, and
a concentration of the light diffusing material in the light-transmissive member on the one of the plurality of outer portions is higher than a concentration of the light diffusing material in the light-transmissive member on the one of the at least one inner portion.

9. The planar light source according to claim 1, wherein the one of the plurality of outer portions further comprises one or more hole portions.

10. The planar light source according to claim 9, wherein the outer light-reflective member has a plurality of opening portions.

11. The planar light source according to claim 10, wherein the inner light-reflective member has a plurality of opening portions.

12. A planar light source, comprising:
a light guide member including a plurality of light-emitting units separated by a groove;
one or more light sources disposed in one or more of the plurality of light-emitting units; and
a light-transmissive member including a light diffusing material,
wherein the plurality of light-emitting units include a plurality of outer portions and at least one inner portion located in a region surrounded by the plurality of outer portions in a plan view,
in the plan view, at least one of the plurality of outer portions is adjacent to a smaller number of light-emitting units than a number of light-emitting units to which one of the at least one inner portion is adjacent,
in a state in which a same power is supplied and one of the plurality of outer portion and one of the at least one inner portion are allowed to individually emit light, brightness of the one of the plurality of outer portions is higher than brightness of the one of the at least one inner portion, the light guide member includes a first surface, a second surface on a side opposite to the first surface, and a first hole portion penetrating from the first surface to the second surface and disposed in each of the plurality of light-emitting units, the one or more light sources are disposed in the first hole portion, the light-transmissive member is disposed in the first hole portion to cover the one or more light sources, and a concentration of the light diffusing material in the light-transmissive member on the one of the plurality of outer portions is higher than a concentration of the light diffusing material in the light-transmissive member on the one of the at least one inner portion.

13. The planar light source according to claim 12, further comprising:

an outer light-reflective member that is disposed on the one of the plurality of outer portions and at a position overlapping the one or more light sources in the plan view and that partially reflects light from the one or more light sources; and an inner light-reflective member that is disposed on the one of the at least one inner portion and at a position overlapping the one or more light sources in the plan view and that partially reflects the light from the one or more light sources.

14. The planar light source according to claim 13, wherein a covering ratio of the outer light-reflective member covering the one of the plurality of outer portions is smaller than a covering ratio of the inner light-reflective member covering the one of the at least one inner portion.

15. The planar light source according to claim 12, wherein brightness of the one or more light sources in the one of the plurality of outer portions is higher than brightness of the one or more light sources in the one of the at least one inner portion.

16. The planar light source according to claim 12, wherein the one of the plurality of outer portions further comprises one or more second hole portions.

17. The planar light source according to claim 16, wherein the one of the at least one inner portion further comprises the one or more second hole portions, and the one of the plurality of outer portions includes a larger number of the one or more second hole portions than the one of the at least one inner portion.

18. The planar light source according to claim 16, wherein the one of the at least one inner portion further comprises the one or more second hole portions, and in the plan view, an area of the one or more second hole portions in the one of the plurality of outer portions is greater than an area of the one or more second hole portions in the one of the at least one inner portion.

19. A planar light source, comprising:

a light guide member including a plurality of light-emitting units separated by a groove, the plurality of light-emitting units including a plurality of outer portions and at least one inner portion located in a region surrounded by the plurality of outer portions in a plan view, wherein in the plan view, at least one of the plurality of outer portions is adjacent to a smaller number of light-emitting units than a number of light-emitting units to which one of the at least one inner portion is adjacent, wherein in a state in which a same power is supplied and one of the plurality of outer portion and one of the at least one inner portion are allowed to individually emit light, brightness of the one of the plurality of outer portions is higher than brightness of the one of the at least one inner portion;

one or more light sources disposed in one or more of the plurality of light-emitting units;

an outer light-reflective member that is disposed on the one of the plurality of outer portions and at a position overlapping the one or more light sources in the plan view and that partially reflects light from the one or more light sources; and an inner light-reflective member that is disposed on the one of the at least one inner portion and at a position overlapping the one or more light sources in the plan view and that partially reflects the light from the one or more light sources, wherein light transmittance of the outer light-reflective member is higher than light transmittance of the inner light-reflective member.

* * * * *